US012612096B1

(12) United States Patent
Kim et al.

(10) Patent No.: US 12,612,096 B1
(45) Date of Patent: Apr. 28, 2026

(54) ATTACHMENT AND DETACHMENT APPARATUS FOR DRIVING OPERATION DEVICE OF VEHICLE

(71) Applicants: Hyundai Motor Company, Seoul (KR); Kia Corporation, Seoul (KR); LS Automotive Technologies Co., Ltd., Anyang-si (KR)

(72) Inventors: Eun Sik Kim, Hwaseong-si (KR); Hun Jung, Anyang-si (KR); Ki Nyeong Ko, Anyang-si (KR); Jung Jae Lee, Anyang-si (KR)

(73) Assignees: Hyundai Motor Company, Seoul (KR); Kia Corporation, Seoul (KR); LS Automotive Technologies Co., Ltd., Anyang-si (KR)

( * ) Notice: Subject to any disclaimer, the term of this patent is extended or adjusted under 35 U.S.C. 154(b) by 0 days.

(21) Appl. No.: 19/194,729

(22) Filed: Apr. 30, 2025

(30) Foreign Application Priority Data

Oct. 30, 2024 (KR) ........................ 10-2024-0151320

(51) Int. Cl.
| | |
|---|---|
| *B62D 1/10* | (2006.01) |
| *B60K 23/02* | (2006.01) |
| *B60K 26/02* | (2006.01) |
| *B60K 35/22* | (2024.01) |
| *B60T 7/08* | (2006.01) |
| *B62D 1/04* | (2006.01) |

(52) U.S. Cl.
CPC ................ *B62D 1/10* (2013.01); *B60K 23/02* (2013.01); *B60K 26/02* (2013.01); *B60T 7/08* (2013.01); *B62D 1/046* (2013.01); *B60K* 2026/028 (2013.01); *B60K 35/22* (2024.01); *B60K 2360/782* (2024.01)

(58) Field of Classification Search
CPC ......... B62D 1/046; B62D 1/10; B62D 1/105; B62D 1/183; B60K 2026/028; B60K 2360/782; B60K 23/02; B60K 26/02; B60K 35/22; B60T 7/08
See application file for complete search history.

(56) References Cited

U.S. PATENT DOCUMENTS

| | | | | |
|---|---|---|---|---|
| 4,811,580 | A * | 3/1989 | Jang .................... | B60R 25/0222 |
| | | | | 70/218 |
| 5,365,803 | A * | 11/1994 | Kelley ................... | B60K 20/06 |
| | | | | 200/61.57 |
| 9,333,983 | B2 * | 5/2016 | Lathrop ................. | B60K 35/22 |
| 9,630,644 | B2 * | 4/2017 | Soderlind ............. | B62D 1/197 |
| 9,764,756 | B2 * | 9/2017 | Sugioka ................ | B62D 1/181 |
| 9,821,765 | B1 * | 11/2017 | Miller ..................... | B62D 1/10 |
| 9,963,035 | B2 * | 5/2018 | El Aile .................. | B60K 35/50 |
| 10,023,124 | B2 * | 7/2018 | Schmidt .................. | B60R 5/02 |

(Continued)

*Primary Examiner* — Laura Freedman

(74) *Attorney, Agent, or Firm* — Morgan, Lewis & Bockius LLP

(57) ABSTRACT

An attachment and detachment apparatus for a driving operation device of a vehicle, is configured to mount or remove a driving operation device, modularized by integrating the operation devices for steering, acceleration, braking, and gear shifting of the vehicle into a single body, to or from a vehicle panel, and is directed to attach the driving operation device to the vehicle panel for use in a manual driving mode and detach the driving operation device from the vehicle panel in an autonomous driving mode, increasing the usability of internal space.

20 Claims, 33 Drawing Sheets

(56)  References Cited

U.S. PATENT DOCUMENTS

| | | | | |
|---|---|---|---|---|
| 10,144,383 | B2 * | 12/2018 | Bodtker | B60R 21/21656 |
| 10,308,215 | B2 * | 6/2019 | Ting | B62D 1/10 |
| 10,486,532 | B2 * | 11/2019 | Chapman | B60K 35/10 |
| 10,526,002 | B2 * | 1/2020 | Schwarz | B62D 1/183 |
| 10,577,009 | B2 * | 3/2020 | Lubischer | B62D 1/183 |
| 10,864,872 | B2 * | 12/2020 | Sheldon | B60R 21/203 |
| 11,142,235 | B2 * | 10/2021 | Watanabe | B60K 35/10 |
| 11,155,293 | B2 * | 10/2021 | Hwang | B62D 1/183 |
| 11,198,463 | B2 * | 12/2021 | Kwon | B62D 1/06 |
| 11,214,293 | B2 * | 1/2022 | Nishimura | B62D 1/187 |
| 11,299,192 | B2 * | 4/2022 | Hirschfeld | B62D 1/18 |
| 11,453,429 | B2 * | 9/2022 | Helmstetter | B62D 1/04 |
| 11,459,016 | B2 * | 10/2022 | Bowen | B62D 1/02 |
| 11,661,106 | B2 * | 5/2023 | Watanabe | B62D 1/183 |
| | | | | 701/41 |
| 12,304,553 | B2 * | 5/2025 | Cui | B62K 9/00 |
| 2019/0118852 | A1 * | 4/2019 | Suzuki | B60K 26/02 |
| 2025/0256680 | A1 * | 8/2025 | Salter | B60R 25/255 |
| 2025/0263104 | A1 * | 8/2025 | Kim | B62D 1/046 |

* cited by examiner

ATTACHMENT AND DETACHMENT APPARATUS FOR DRIVING OPERATION DEVICE OF VEHICLE

CROSS-REFERENCE TO RELATED APPLICATION(S)

The present application claims priority to Korean Patent Application No. 10-2024-0151320, filed on Oct. 30, 2024, the entire contents of which is incorporated herein for all purposes by this reference.

BACKGROUND OF THE PRESENT DISCLOSURE

Field of the Present Disclosure

The present disclosure relates to an attachment and detachment apparatus for a driving operation device of a vehicle, and more specifically, to a technology relating to an attachment and detachment apparatus for a driving operation device of a vehicle capable of attaching or detaching a driving operation device for steering, acceleration, braking, and shifting to or from a vehicle.

Description of Related Art

An autonomous vehicle is a smart vehicle to which autonomous driving technology is applied so that the vehicle autonomously drives to the destination without a driver's direct operation of the steering wheel, accelerator pedal, and brakes.

When autonomous driving is universally realized, the driver is able to choose between a manual driving mode in which the driver directly drives the vehicle and an autonomous driving mode in which the vehicle drives to the destination on its own without the driver's directly driving.

The driving operation device of an autonomous vehicle typically includes operation portions for steering, acceleration, braking, and shifting, and these operation portions may be integrated into a single body to configure a module.

However, the conventional driving operation device is fixed to the vehicle, which may cause inconvenience in use.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an attachment and detachment apparatus for a driving operation device of a vehicle, which enables the driving operation device, modularized by integrating the operation portions for steering, acceleration, braking, and shifting into a single body, to be mounted to or removed from the vehicle, and aims to attach the driving operation device to the vehicle for use in a manual driving mode and to detach the driving operation device from the vehicle in an autonomous driving mode, increasing the usability of internal space.

The technical subjects pursued in the present disclosure may not be limited to the above-mentioned technical subjects, and other technical subjects which are not mentioned may be clearly understood from the following descriptions by those skilled in the art to which the present disclosure pertains.

According to an exemplary embodiment of the present disclosure, an attachment and detachment apparatus for a driving operation device of a vehicle may include: a rod portion which is rotatably coupled to a vehicle panel, protrudes from the vehicle panel or is inserted into the vehicle panel when rotated, and includes a first connector provided at an end portion thereof; and a locking module which is provided in the driving operation device of the vehicle, is configured for being coupled to or separated from the rod portion, and includes a second connector connected to the first connector when coupled to the rod portion.

In an exemplary embodiment of the present disclosure, the attachment and detachment apparatus further includes a mounting pin mounted at the end portion of the rod portion and including first and second end portions protruding laterally from the rod portion, and when the end portion of the rod portion is inserted into the locking module, the mounting pin is secured by the locking module, preventing separation of the rod portion and the locking module.

In an exemplary embodiment of the present disclosure, a first hole and a second hole are formed at one end portion of the rod portion to be spaced apart from each other along a rotation direction about a hinge, and the vehicle panel includes an operation button. A fixing pin is provided on the vehicle panel with a first spring and engaged with the operation button, and if the operation button is operated, the fixing pin moves in a straight line to be inserted into the first hole or the second hole, restricting rotation of the rod portion, or to escape from the first hole or the second hole, releasing the rotation restriction of the rod portion.

In an exemplary embodiment of the present disclosure, if the fixing pin is inserted into one of the first hole and the second hole, the rod portion is restricted from rotating while protruding from the vehicle panel, and if the fixing pin is inserted into the other one, the rod portion is restricted from rotating while inserted into the vehicle panel.

In an exemplary embodiment of the present disclosure, a cover is provided in the vehicle panel to be movable, and the cover is configured to cover the rod portion inserted into the vehicle panel so as not to be exposed from the vehicle panel.

In an exemplary embodiment of the present disclosure, wires are mounted inside the rod portion to avoid the mounting pin and connected to the first connector.

In an exemplary embodiment of the present disclosure, the driving operation device includes: a rotation portion that rotates during steering operation; and a fixing portion which is stationary, regardless rotation of the rotation portion, in the center of the rotation portion and includes a locking module.

In an exemplary embodiment of the present disclosure, the driving operation device includes a steering operation portion, an acceleration operation portion, a braking operation portion, and a shift operation portion, wherein the steering operation device, the acceleration operation portion, and the braking operation portion are provided in the rotation portion, and wherein the shift operation portion and a display are provided in the fixing portion.

In an exemplary embodiment of the present disclosure, the locking module includes: a connector housing coupled to the fixing portion of the driving operation device and including a second connector; a rotating locking ring overlapping the connector housing and provided to be rotatable clockwise and counterclockwise about a center line; a second spring provided in the connector housing, and including one end portion supported by the connector housing and the other end portion provided with an arc guide coupled to the rotating locking ring, rotating the rotating locking ring, which has been rotated clockwise or counterclockwise, in the opposite direction to return to the original state; a cover plate configured to cover the connector housing and the rotating locking ring, and coupled to the fixing portion of the driving operation device so that a portion of the rotating locking ring passes through the same to protrude therefrom; and a rotation lever coupled to the portion of the rotating locking ring passing through the cover plate and protruding therefrom, and configured to rotate, when rotating clockwise or counterclockwise, the rotating locking ring in the same direction.

In an exemplary embodiment of the present disclosure, if the end portion of the rod portion is inserted into the connector housing so that the first connector and the second connector are coupled, the mounting pin comes into contact with the rotating locking ring between the connector housing and the rotating locking ring, and the rotating locking ring restricts movement of the mounting pin in a direction in which the rod portion is separated from the connector housing, preventing separation of the rod portion.

In an exemplary embodiment of the present disclosure, the attachment and detachment apparatus further includes an elastic stopper which is fixed to the connector housing and comes into contact with the mounting pin when the rod portion is inserted into the connector housing so that the first connector and the second connector are coupled.

In an exemplary embodiment of the present disclosure, the second connector is provided in the center of the connector housing, and an arc groove in which a second spring including an arc guide is provided and a stopper groove in which the elastic stopper is provided are formed on the outside of the second connector.

In an exemplary embodiment of the present disclosure, a guide protrusion is provided on one side of the rotating locking ring to be coupled to an arc guide, and a protruding portion is provided on the other side of the rotating locking ring to pass through the cover plate and be coupled to the rotation lever. Furthermore, internal protrusions are formed on the internal surface of the rotating locking ring to protrude toward the center of the rotating locking ring and face each other, and the internal protrusion restricts movement of the mounting pin when the rod portion is inserted into the connector housing so that the first connector and the second connector are coupled, preventing the rod portion from being separated from the connector housing.

In an exemplary embodiment of the present disclosure, when the end portion of the rod portion is inserted into the locking module in a state where the driving operation device and the rod portion are separated, the mounting pin comes into contact with one surface of the internal protrusion, and the one surface of the internal protrusion that comes into contact with the mounting pin is configured as an inclined surface.

In an exemplary embodiment of the present disclosure, a pair of internal protrusions is formed on the internal surface of the rotating locking ring to face each other, and the inclined surface is formed in a point-symmetrical structure with respect to the center of the rotating locking ring.

In an exemplary embodiment of the present disclosure, when the mounting pin moves toward the connector housing while being in contact with the inclined surface, the rotating locking ring rotates clockwise or counterclockwise, and when the rotating locking ring rotates clockwise or counterclockwise, the stopper groove in which the elastic stopper is provided is opened in the connector housing, and the mounting pin is inserted into the open stopper groove and comes into contact with the elastic stopper.

In an exemplary embodiment of the present disclosure, if the mounting pin comes into contact with the elastic stopper and if the first connector and the second connector are coupled, the rotating locking ring rotates in the opposite direction by spring force of a second spring and returns to the original state, so that the stopper groove is covered by the internal protrusion, and the internal protrusion restricts movement of the mounting pin and prevents the rod portion from being separated from the connector housing.

In an exemplary embodiment of the present disclosure, when the end portion of the rod portion is inserted into the locking module in a state where the driving operation device and the rod portion are separated, the mounting pin comes into contact with one surface of the internal protrusion, and the one surface of the internal protrusion that comes into contact with the mounting pin is formed as a flat surface. Furthermore, if a user holds a handle of the rotation lever and rotates the rotation lever clockwise or counterclockwise while the mounting pin is in contact with the flat surface of the internal protrusion, the rotating locking ring rotates together with the rotation lever, and the rotation of the rotating locking ring opens the stopper groove in which the elastic stopper is provided in the connector housing, so that the mounting pin is inserted into the opened stopper groove and comes into contact with the elastic stopper.

In an exemplary embodiment of the present disclosure, if a user presses the driving operation device toward the vehicle panel in a state where the driving operation device is attached to the rod portion due to coupling of the rod portion and the locking module, the mounting pin presses the elastic stopper to be compressed, so that a predetermined gap is generated between the mounting pin and the internal protrusion of the rotating locking ring. With the gap generated above, if a user holds a handle of the rotation lever and rotates the rotation lever clockwise or counterclockwise, the rotating locking ring rotates together with the rotation lever, so that the stopper groove in which the elastic stopper is provided is opened by the rotation of the rotating locking ring. If the user pulls the driving operation device in the state where the stopper groove is open, the rod portion and the locking module are separated, so that the driving operation device is detached from the rod portion.

In an exemplary embodiment of the present disclosure, a central hole is formed in the center of the cover plate so that the end portion of the rod portion passes therethrough, and a mounting pin hole through which the mounting pin passes is formed on both sides of the central hole to connect with the same. A protruding portion hole through which the protruding portion of the rotating locking ring passes is formed in an arc shape on the external side of the mounting pin hole, and an entrance of the central hole is formed to include a trapezoidal cross-section that spreads outward.

The attachment and detachment apparatus for a driving operation device of a vehicle according to an exemplary embodiment of the present disclosure is configured to attach or detach the driving operation device, which is modularized by integrating the operation portions for steering, acceleration, braking, and shifting of the vehicle into a single body, to or from the vehicle panel so that the driving operation device is mounted to the vehicle panel and used in a manual driving mode and is removed from the vehicle panel in an autonomous driving mode, increasing the usability of internal space.

Advantageous effects obtainable from the present disclosure may not be limited to the above-mentioned effects, and other effects which are not mentioned may be clearly understood from the following descriptions by those skilled in the art to which the present disclosure pertains.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
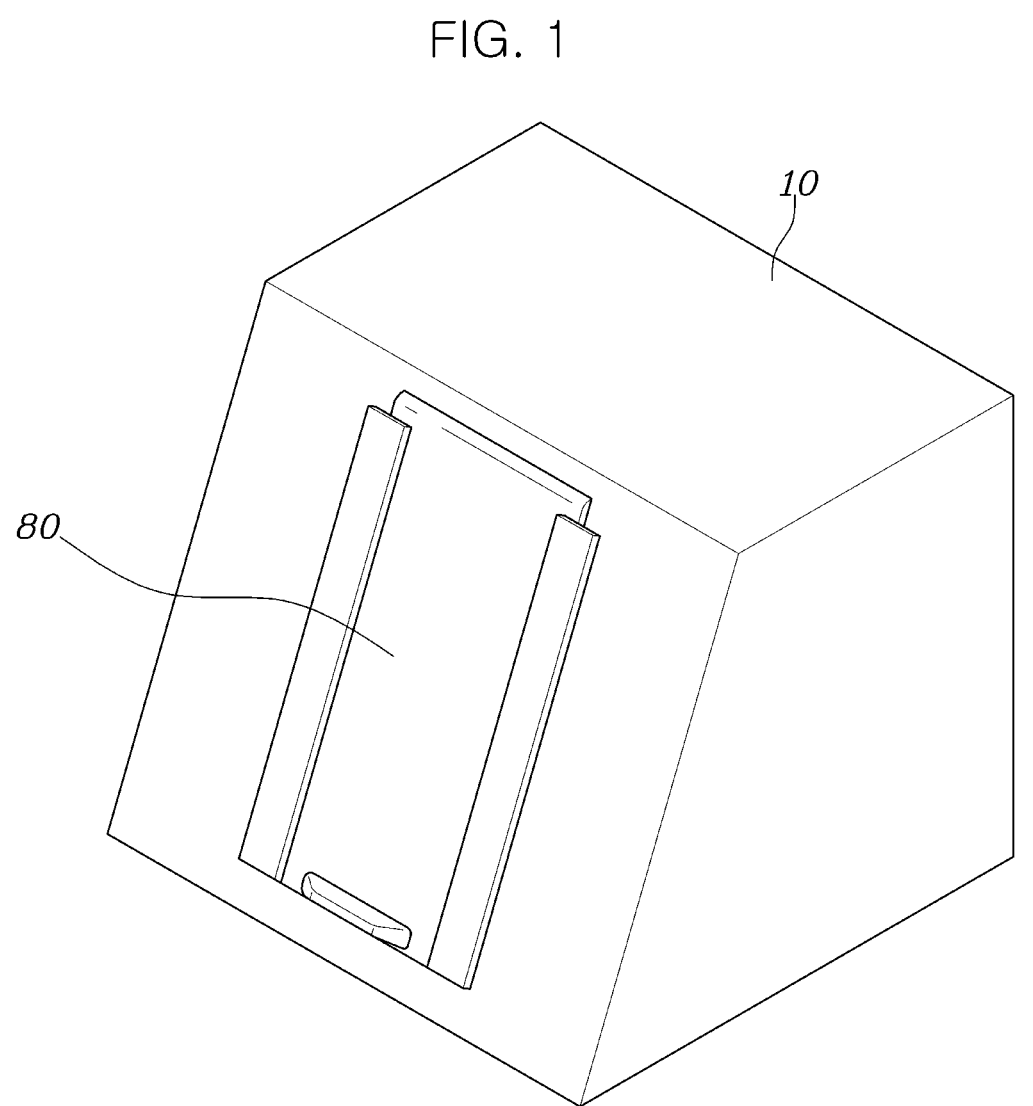
FIG. 1 and FIG. 2 are drawings illustrating the state in which a rod portion is inserted into a vehicle panel according to an exemplary embodiment of the present disclosure.
Figure 2:
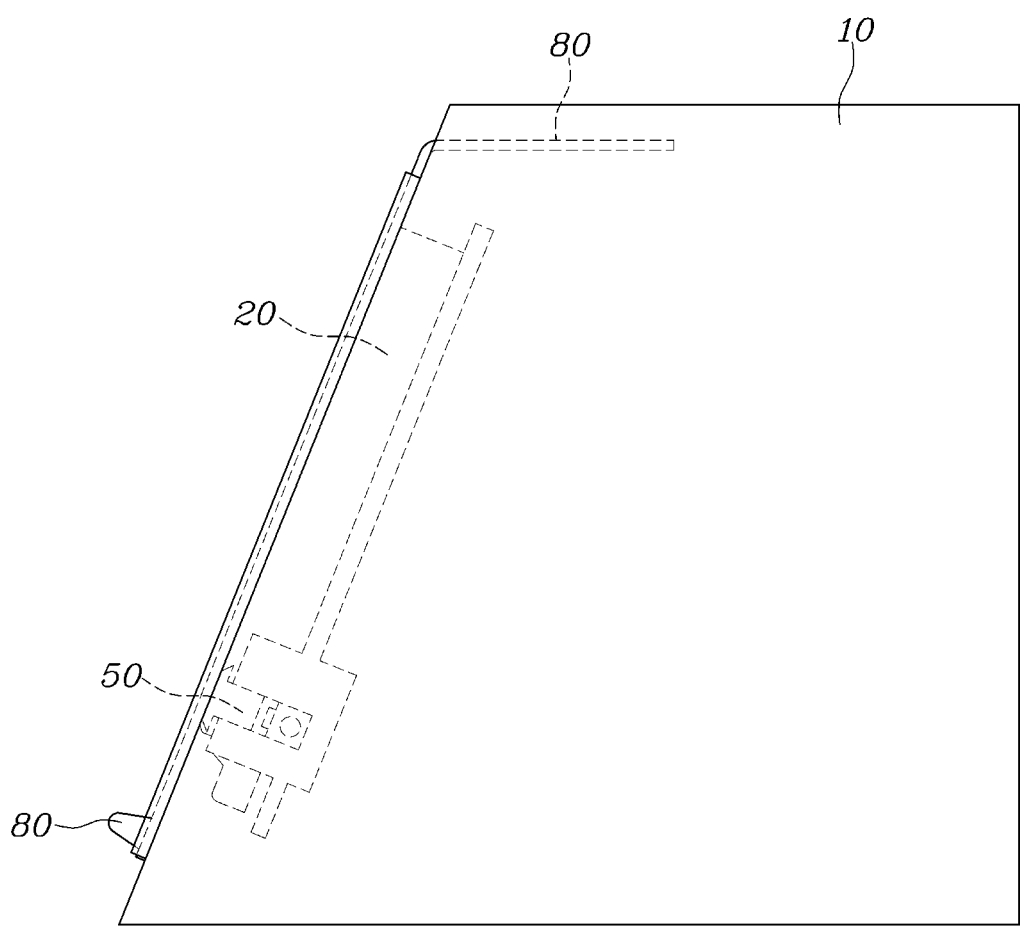

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

In describing the exemplary embodiments set forth herein, a detailed description of known functions or configurations incorporated herein will be omitted when it is determined that the description may make the subject matter of the exemplary embodiments set forth herein unclear. Furthermore, it should be appreciated that the accompanying drawings are provided only for the sake of easy understanding of the exemplary embodiments set forth herein, and the technical idea of the present disclosure is not limited to the accompanying drawings and includes all modifications, equivalents, or alternatives falling within the spirit and scope of the present disclosure.

Terms including an ordinal number such as "a first" and "a second" may be used to describe various elements, but the elements are not limited to the terms. The above terms are used merely for distinguishing one element from other elements.

A singular expression includes a plural expression unless they are definitely different in the context.

As used herein, the expression "comprise", "include" or "have" are intended to specify the existence of mentioned features, numbers, steps, operations, elements, components, or combinations thereof, and should be construed as not precluding the possible existence or addition of one or more other features, numbers, steps, operations, elements, components, or combinations thereof.

The terms "module" and "unit" used for the elements in the following description are provided or interchangeably used in consideration of only the ease of writing the specification, and do not have distinct meanings or roles by themselves.

In the case where an element is referred to as being "connected" or "coupled" to any other elements, it should be understood that not only the element may be directly connected or coupled to the other elements, but also another element may exist therebetween. Contrarily, in the case where an element is referred to as being "directly connected" or "directly coupled" to any other element, it should be understood that no other element exists therebetween.

A unit or a control unit included in names such as a motor control unit (MCU) and a hybrid control unit (HCU) is merely a term widely used for naming a controller configured to control a specific function of a vehicle, but does not mean a generic function unit.

A controller may include a communication device configured to communicate with a sensor or another control unit, a memory configured to store an operation device, a logic command, or input/output information, and at least one processor configured to perform determination, calculation, decision or the like which are required for responsible function controlling.

Hereinafter, various exemplary embodiments set forth herein will be described in detail with reference to the accompanying drawings, and the same or similar elements are provided the same and similar reference numerals regardless of figure numbers, so duplicate descriptions thereof will be omitted.

An attachment and detachment apparatus for a driving operation device according to an exemplary embodiment of the present disclosure may include: as shown in FIG. 1, FIG.

Figure 33:
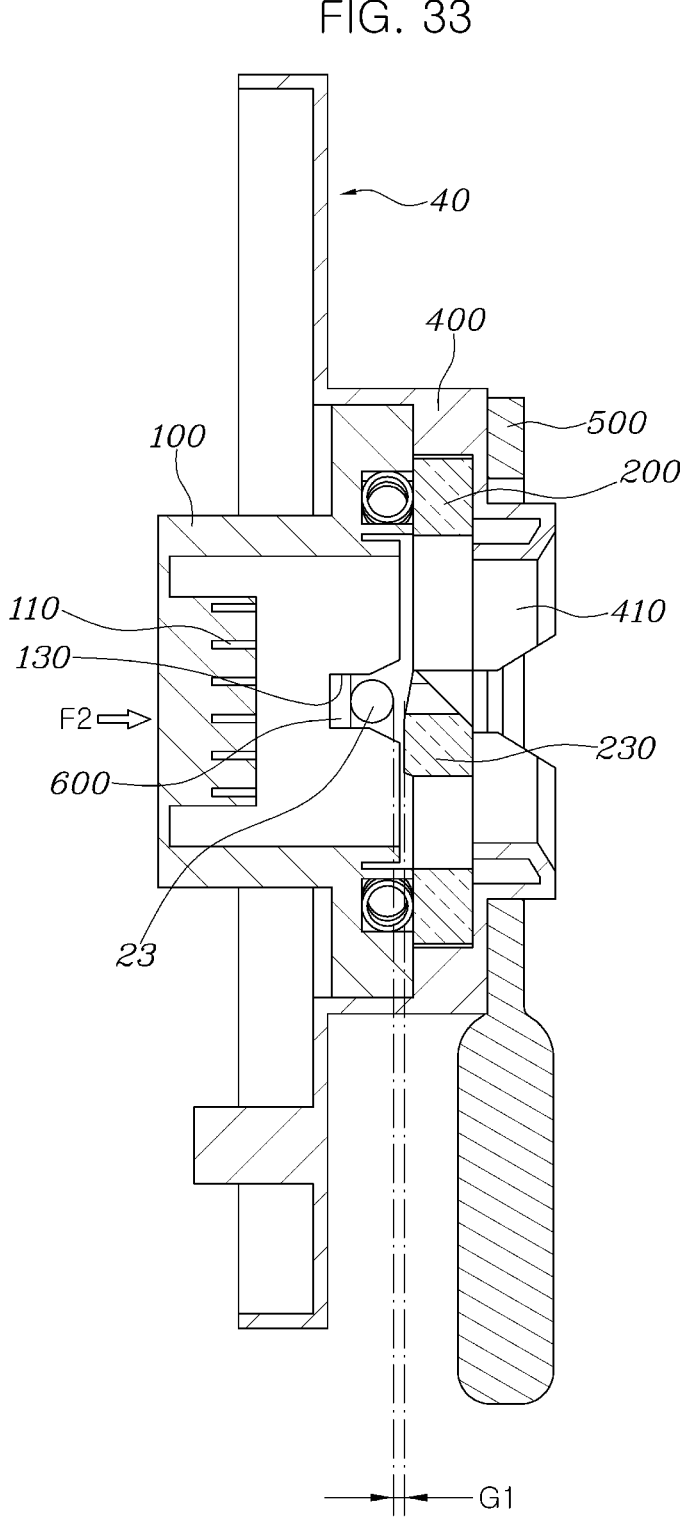
FIG. 33 is a drawing illustrating a driving operation device when detached from a rod portion.

2, and FIG. 33, a rod portion 20 which is rotatably coupled to a vehicle panel 10, protrudes from the vehicle panel 10 or is inserted into the vehicle panel 10 when rotated, and includes a first connector 21 provided at an end of the vehicle panel 10; and a locking module 40 which is provided in the driving operation device 30 of the vehicle, is configured for being coupled to or separated from the rod portion 20, and includes a second connector 110 which is connected to the first connector 21 when coupled to the rod portion 20.

The vehicle panel 10 may be a panel portion in the interior of the vehicle, and may include a center fascia.

The lower portion of the rod portion 20 may be rotatably coupled to the vehicle panel 10 via a hinge 22, and when the rod portion 20 is rotated about the hinge 22, the rod portion 20 may protrude from the vehicle panel 10 or may be inserted into the vehicle panel 10.

To the present end, the vehicle panel 10 may include an insertion hole 11 into which the rod portion 20 may be inserted.

A mounting pin 23 may be provided at the end portion of the rod portion 20 to penetrate the end portion of the rod portion 20 so that both end portions of the mounting pin 23 protrude from the lateral sides of the rod portion 20.

When the end portion of the rod portion 20 is inserted into the locking module 40, the mounting pin 23 is secured by the locking module 40, preventing separation of the rod portion 20 and the locking module 40.

A first hole 24 and a second hole 25 may be formed at one end portion of the rod portion 20 to be spaced apart from each other along a rotation direction about the hinge 22, and the first hole 24 and the second hole 25 may be disposed at 90 degrees therebetween at the one end portion of the rod portion 20, but are not limited thereto.

An operation button 50 that a user presses and operates may be provided on the vehicle panel 10, and a fixing pin 60 that comes into contact with the operation button 50 may be provided on the vehicle panel 10 with a first spring 70.

In an exemplary embodiment of the present disclosure, the operation button 50 may include a first wedge portion 55 and the fixing pin 60 may include a second wedge portion 65 and when the first wedge portion 55 of the operation button 50 moves in a first direction, the second wedge portion 65 of the fixing pin 60 moves in a second direction which is perpendicular to the first direction.

When the operation button 50 is operated, the fixing pin 60 may move in a straight line so that the end portion of the fixing pin 60 is inserted into the first hole 24 or the second hole 25, restricting the rotation of the rod portion 20, or escapes from the first hole 24 or the second hole 25, releasing the rotation restriction of the rod portion 20.

When the fixing pin 60 is inserted into one of either the first hole 24 or the second hole 25, the rod portion 20 is restricted from rotating while protruding from the vehicle panel 10, and when it is inserted into the other one of either the first hole 24 or the second hole 25, the rod portion 20 may be restricted from rotating while inserted into the vehicle panel 10.

Figure 3:
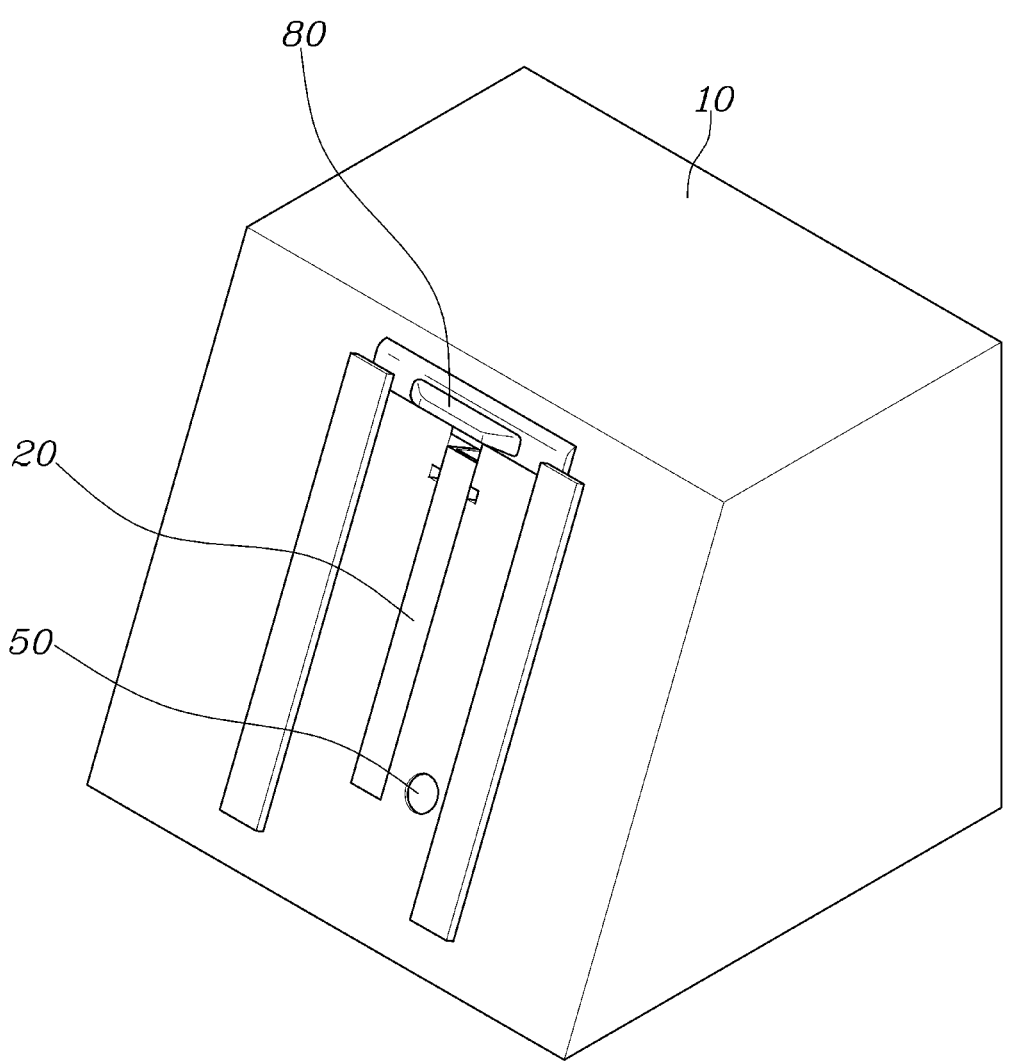
FIG. 3 and FIG. 4 are drawings illustrating the state in which a cover is opened in FIG. 1 and FIG. 2.
Figure 4:
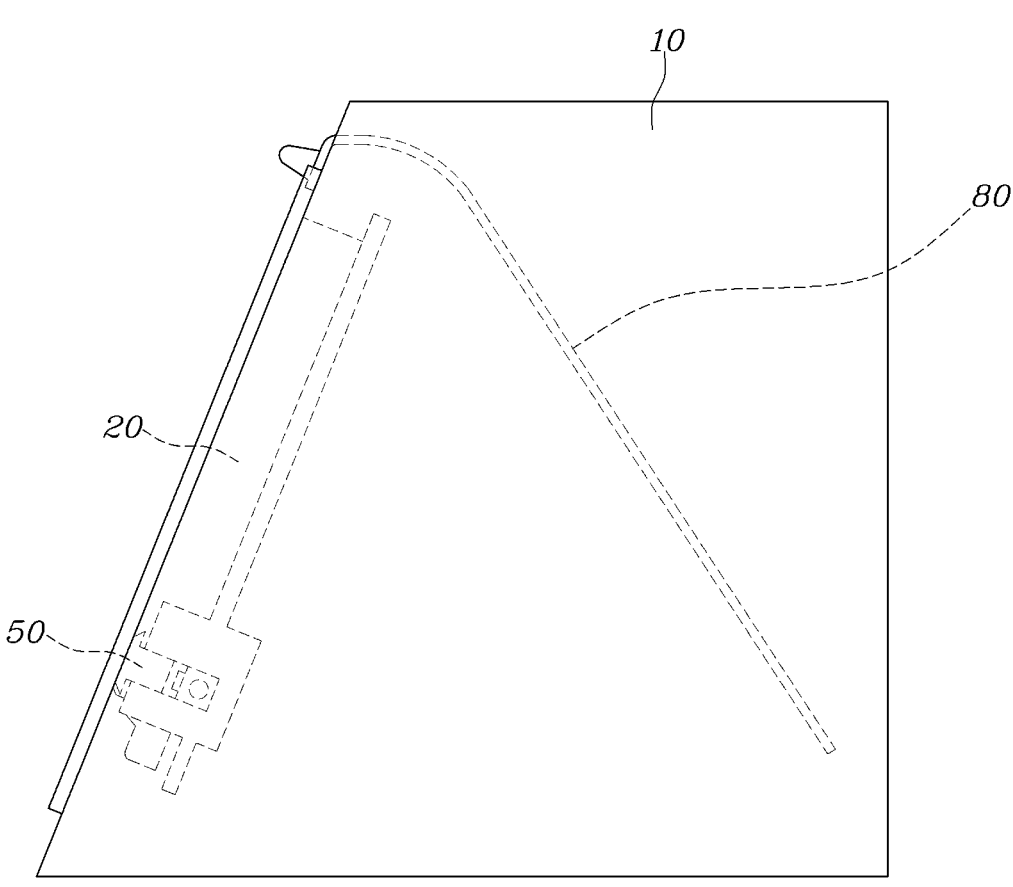
Figure 12:
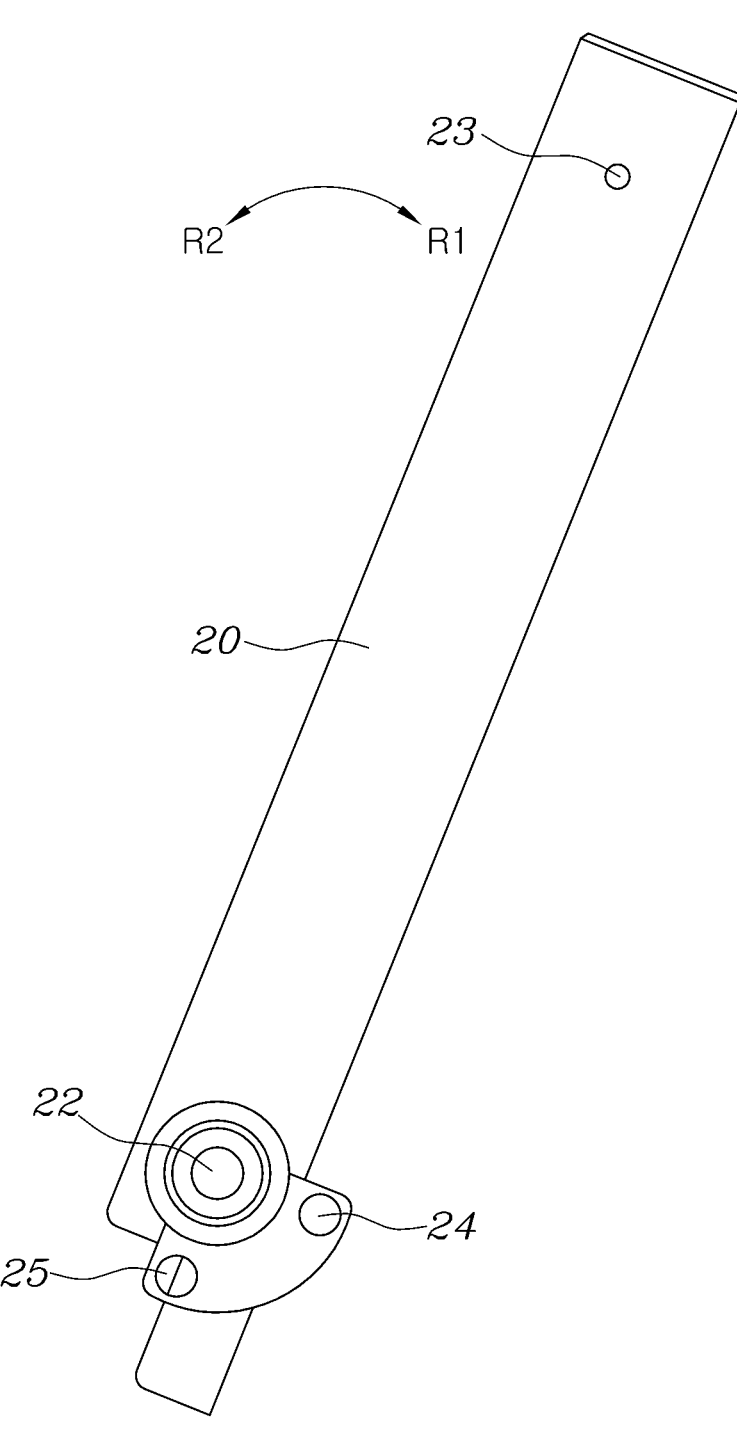
Figure 13:
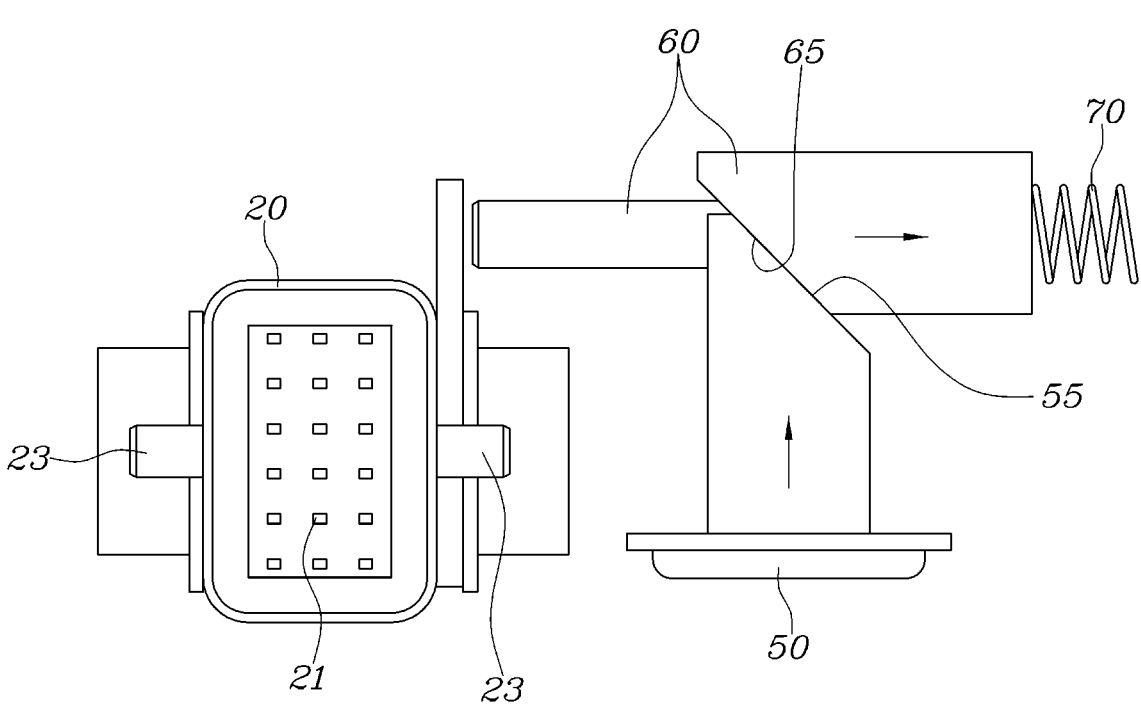
Figure 14:
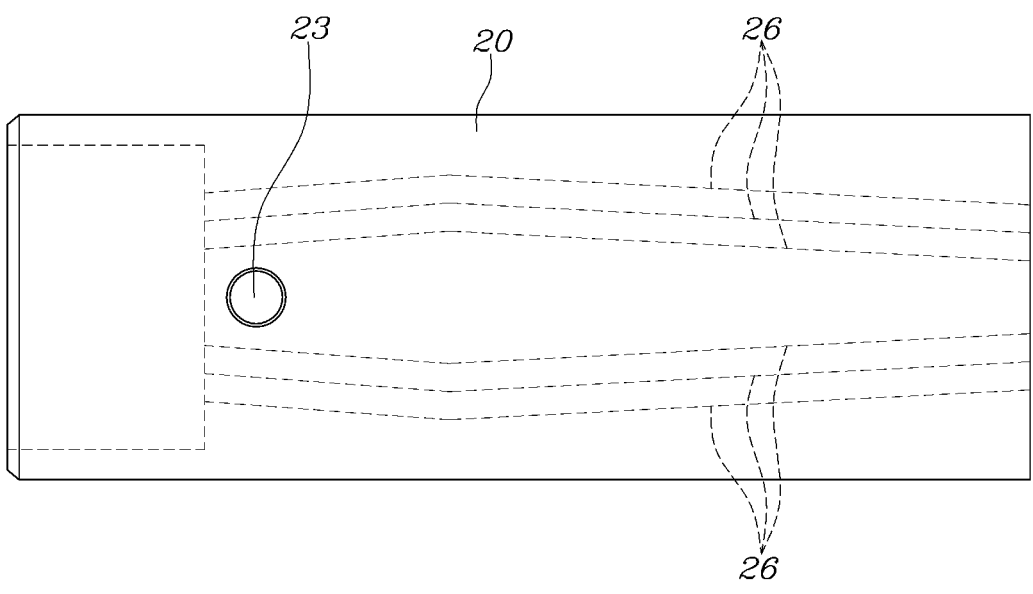
Figure 15:
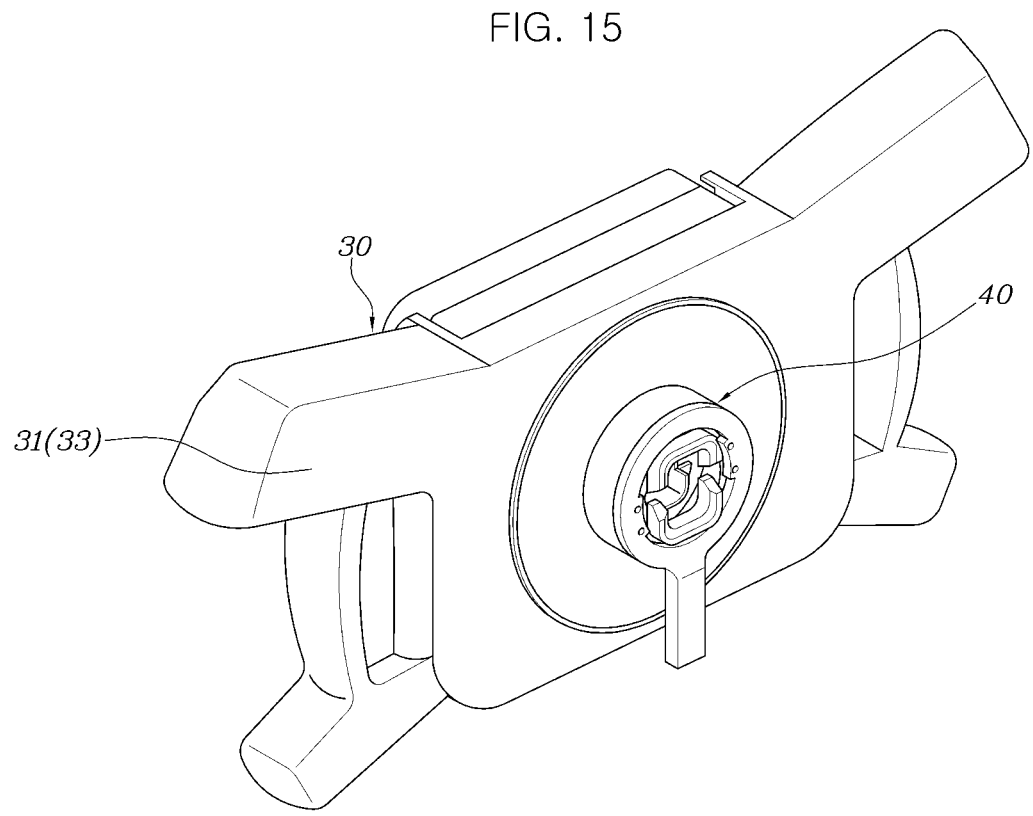
FIG. 15 is a perspective view of a driving operation device to which a locking module is coupled according to an exemplary embodiment of the present disclosure.
Figure 16:
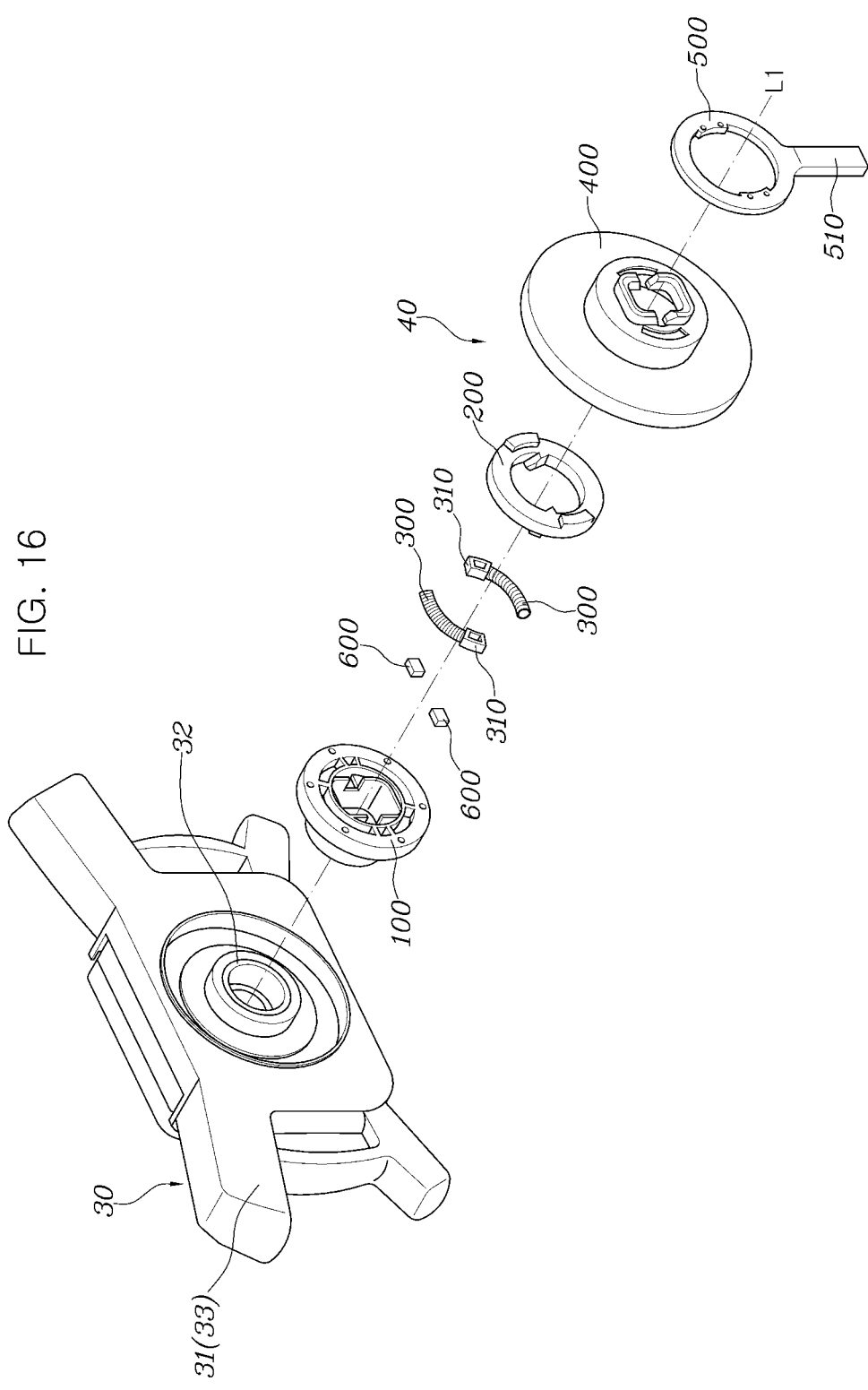
FIG. 16 is an exploded view of the configuration in FIG. 15.
Figure 17:
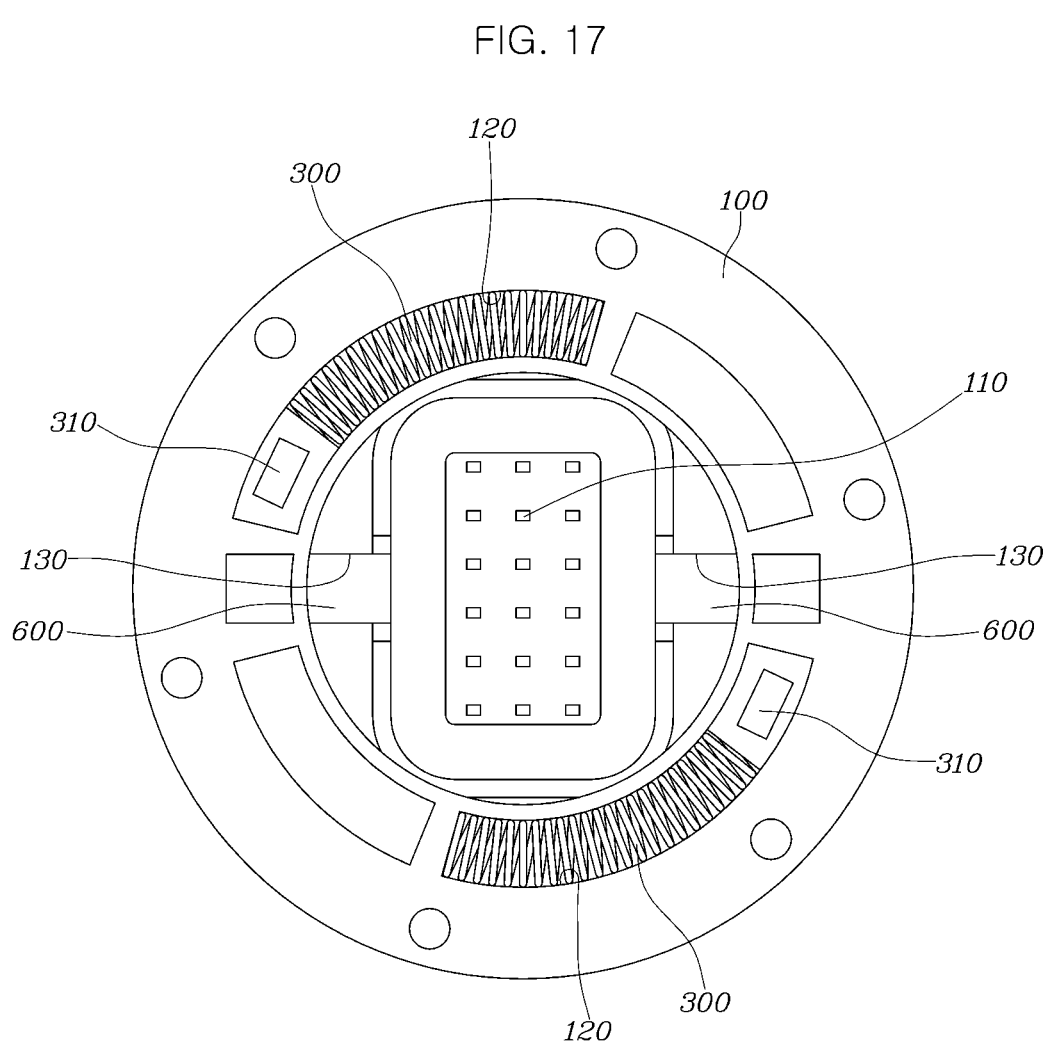
FIG. 17, FIG. 18, FIG. 19, FIG. 20, FIG. 21, FIG. 22, FIG. 23, FIG. 24, FIG. 25 and FIG. 26 are drawings illustrating a locking module according to an exemplary embodiment of the present disclosure.
Figure 18:
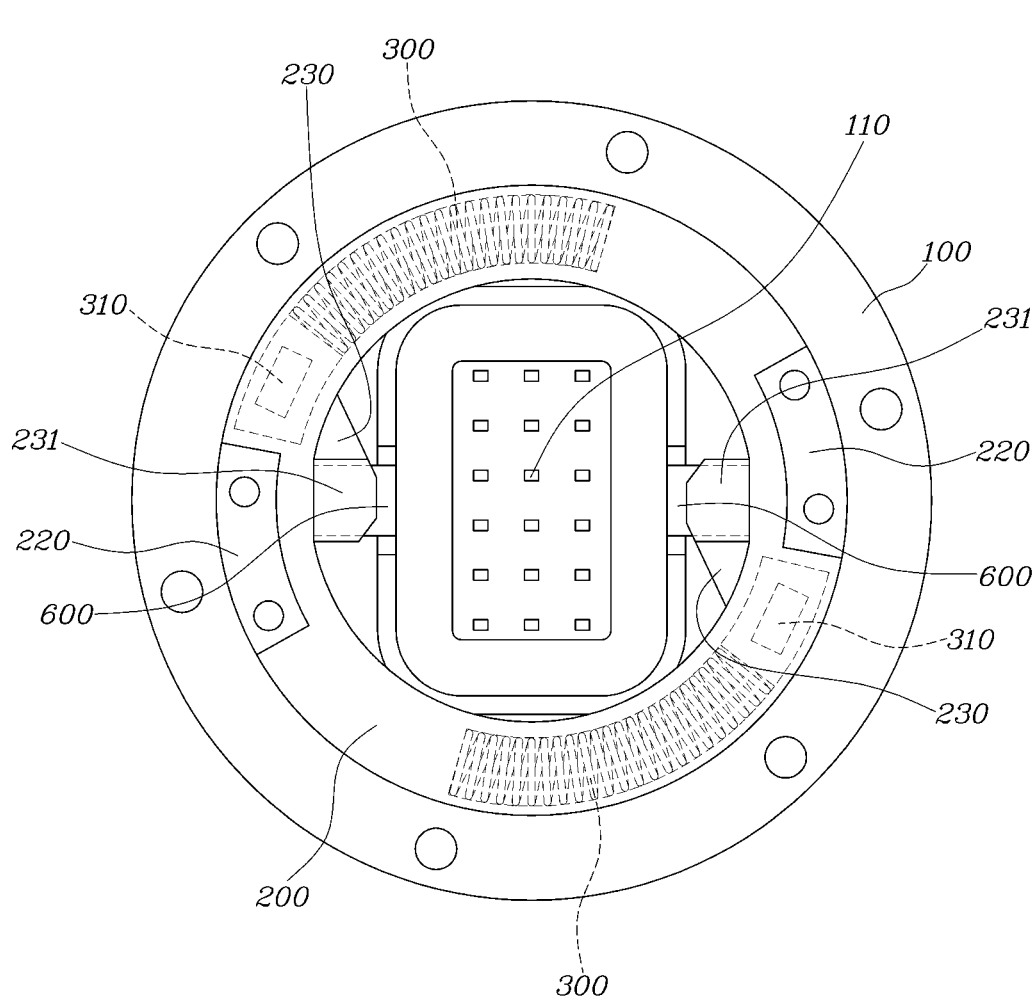
Figure 19:
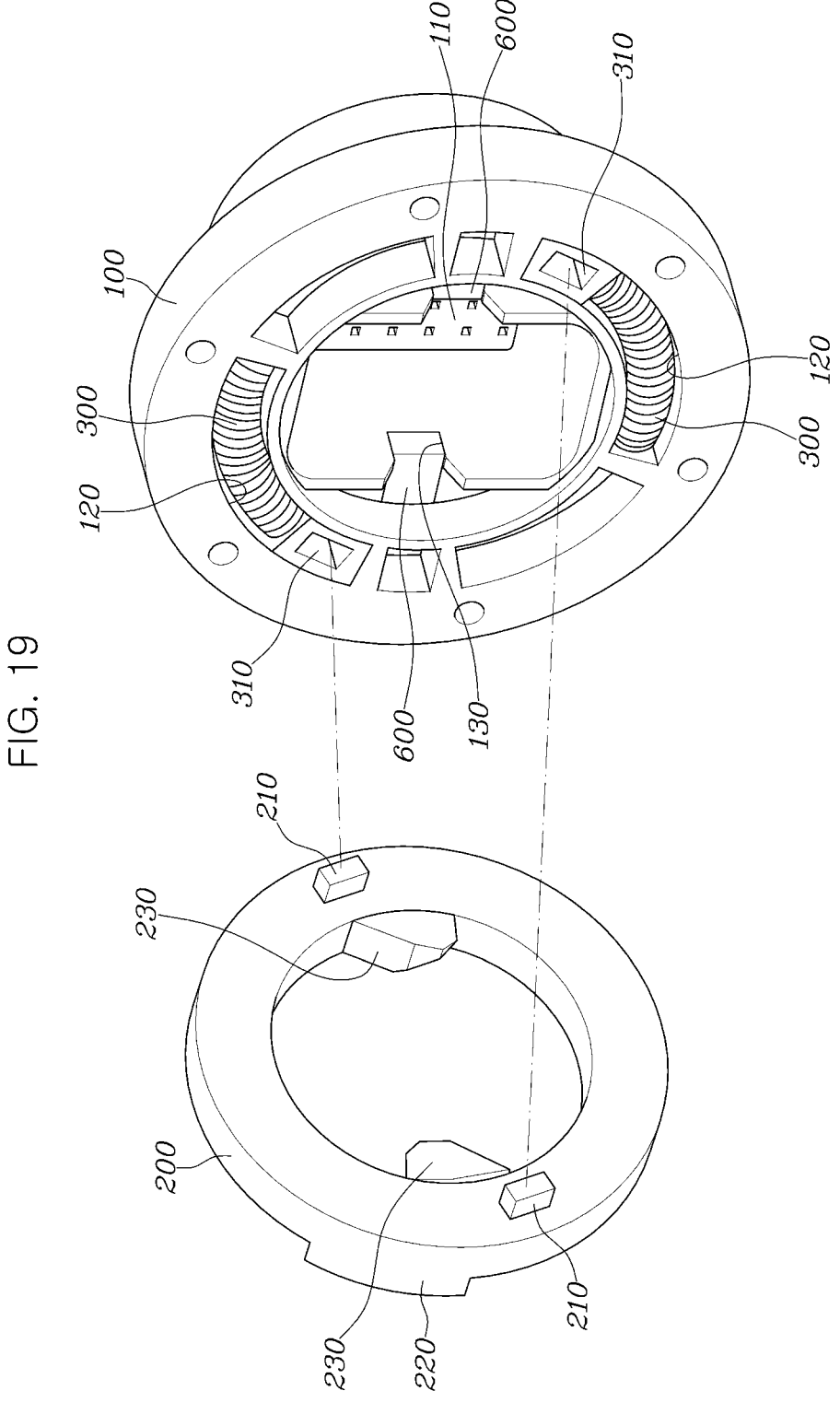
Figure 20:
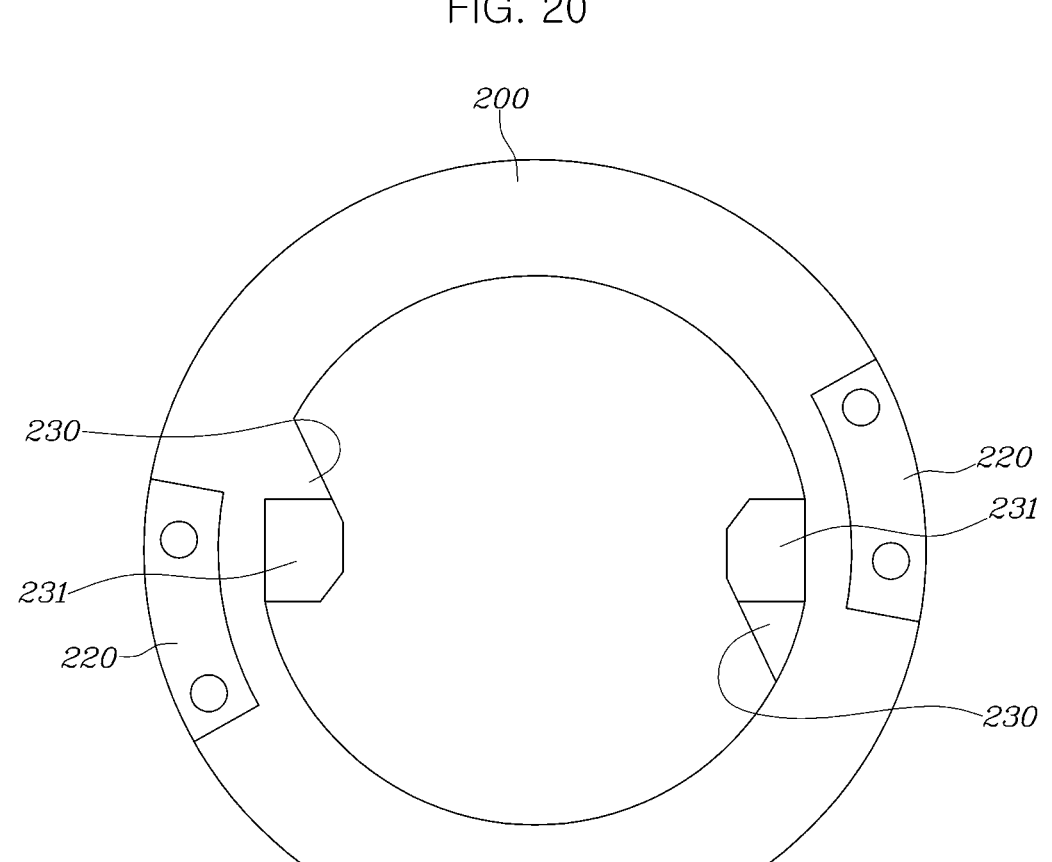
Figure 21:
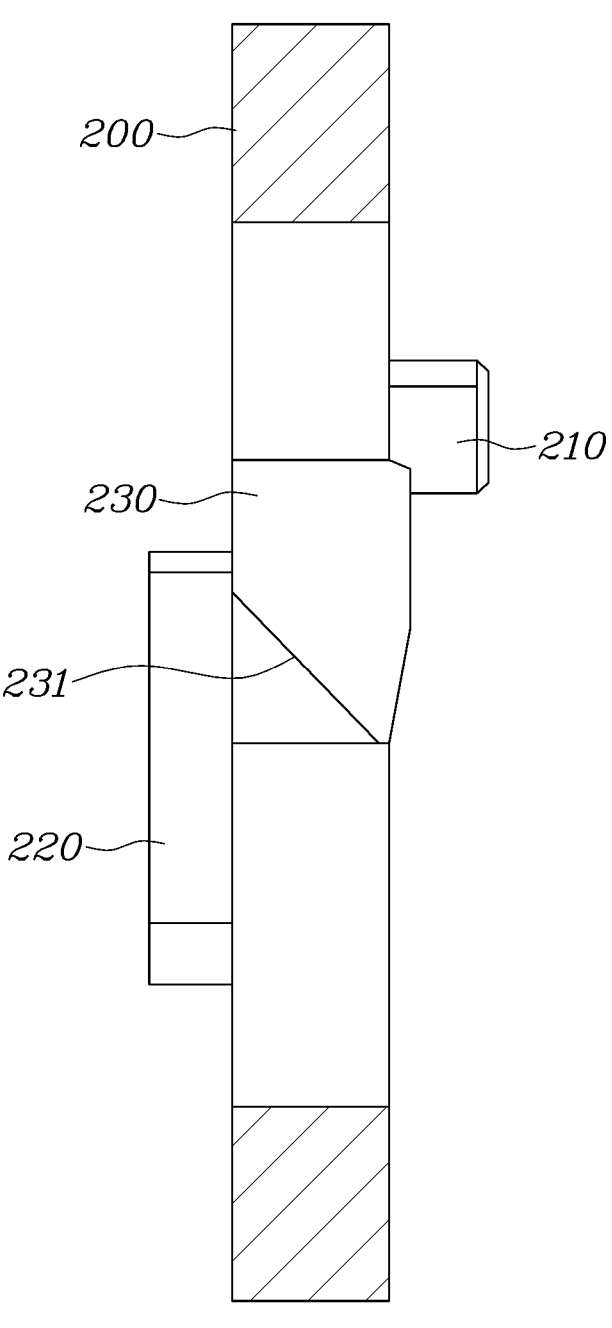

FIG. 3 shows the state in which the rod portion 20 is inserted into the vehicle panel 10, and referring to FIG. 12, the rod portion 20 is rotated in the R1 direction, and at the instant time, the fixing pin 60 is inserted into the first hole 24.

Figure 5:
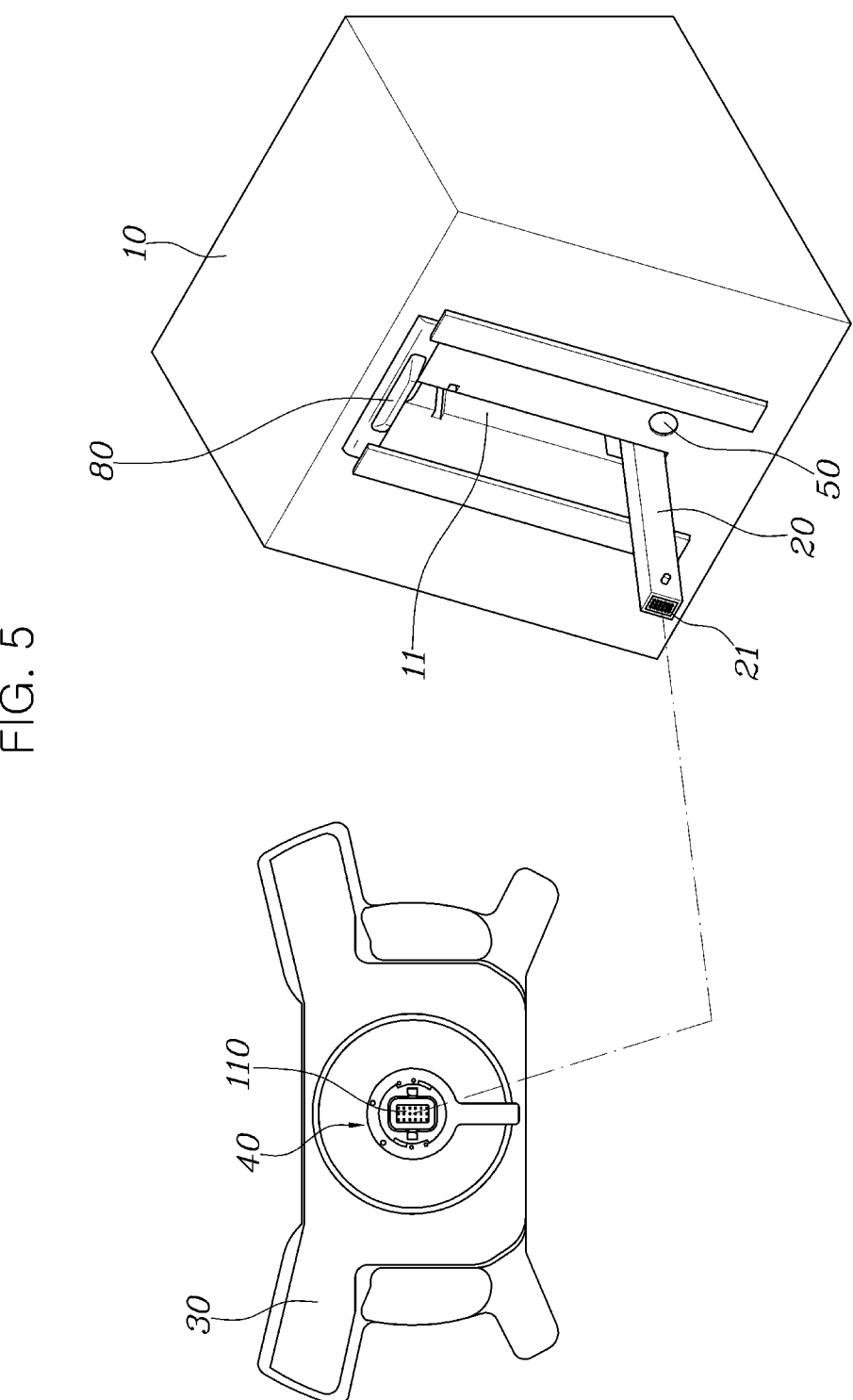
FIG. 5 and FIG. 6 are drawings illustrating the state in which the rod portion protrudes from the vehicle panel in FIG. 3 and FIG. 4.
Figure 6:
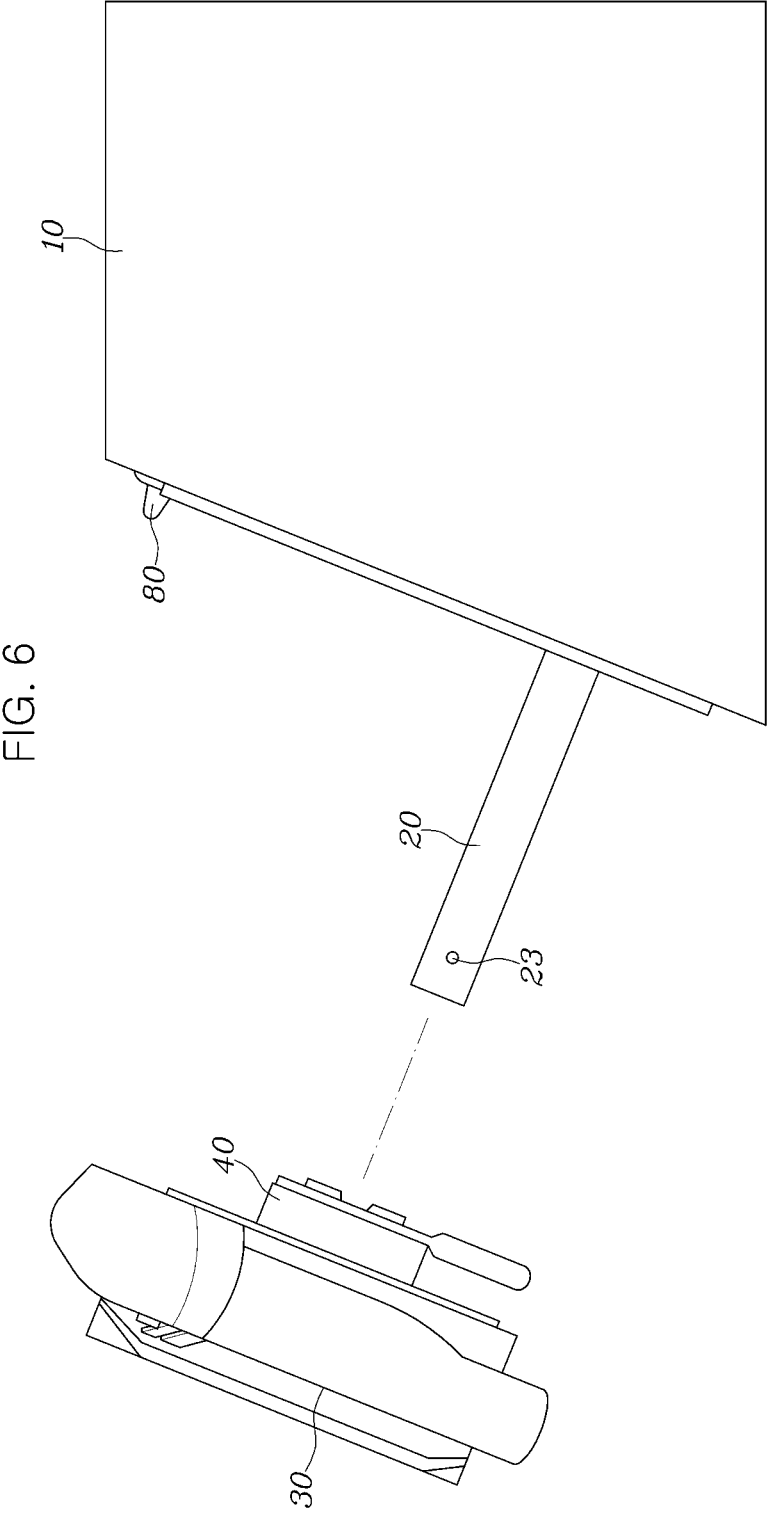
Figure 7:
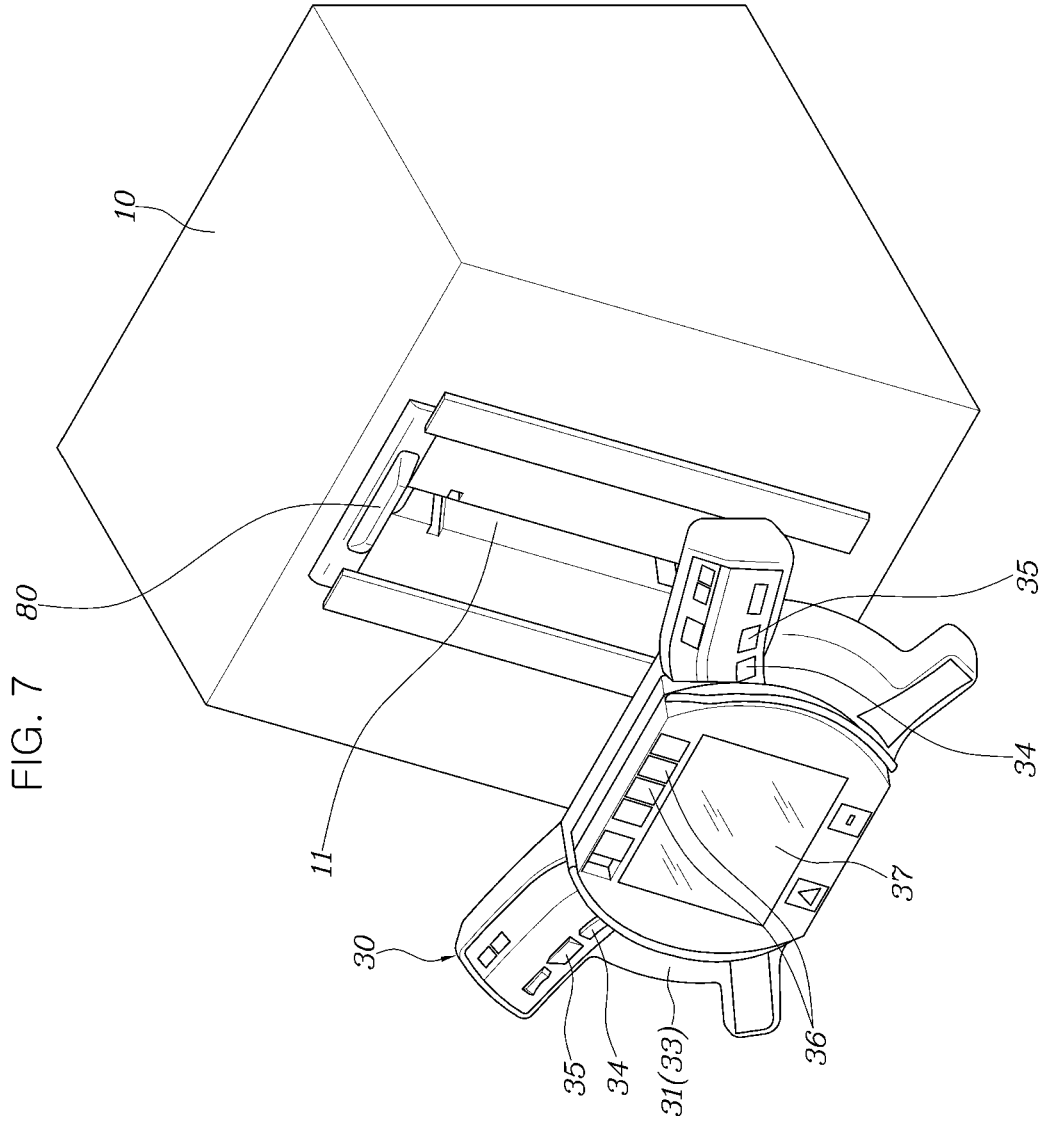
FIG. 7 and FIG. 8 are drawings illustrating the state in which a driving operation device is attached to a rod portion.
Figure 8:
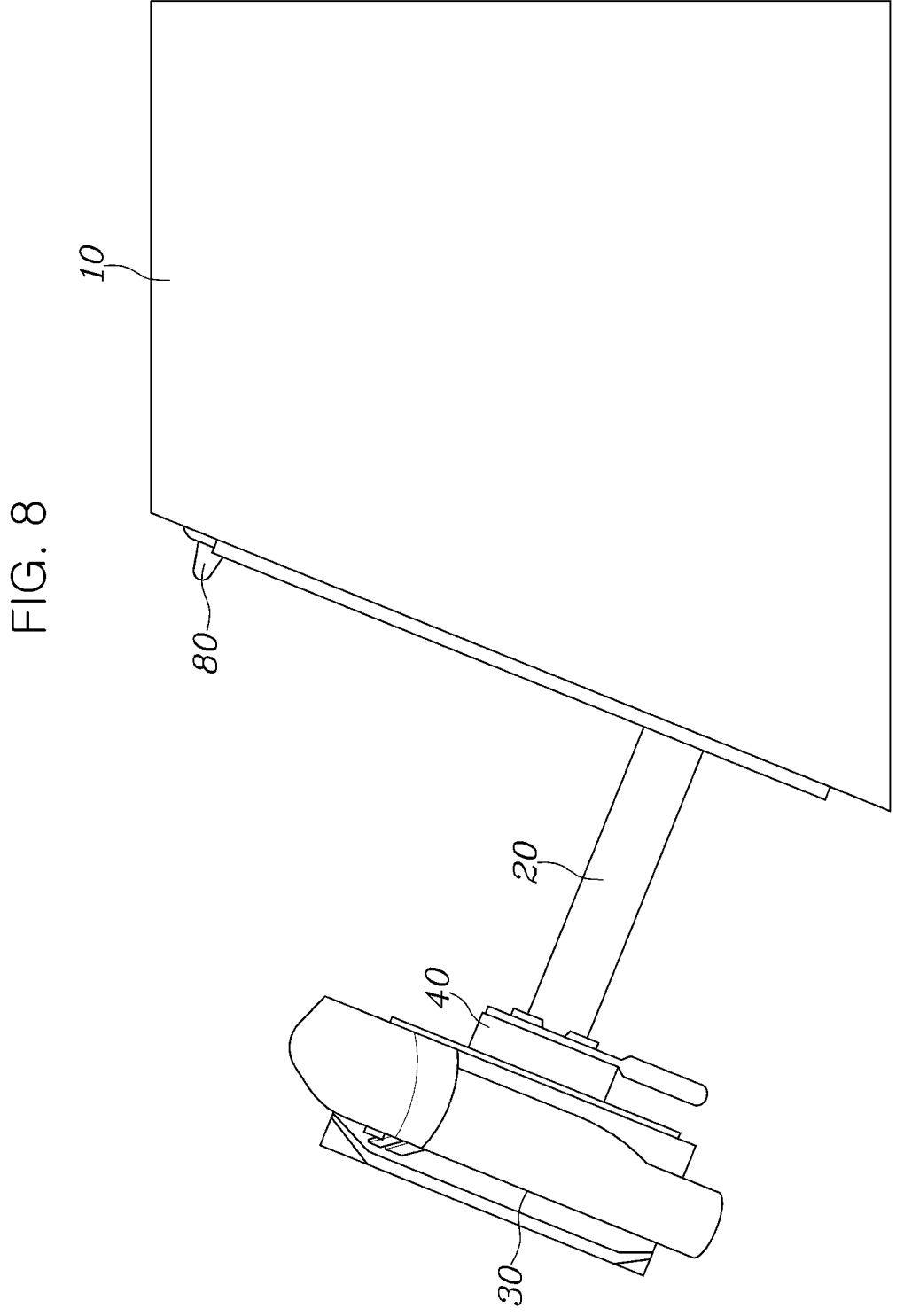
Figure 9:
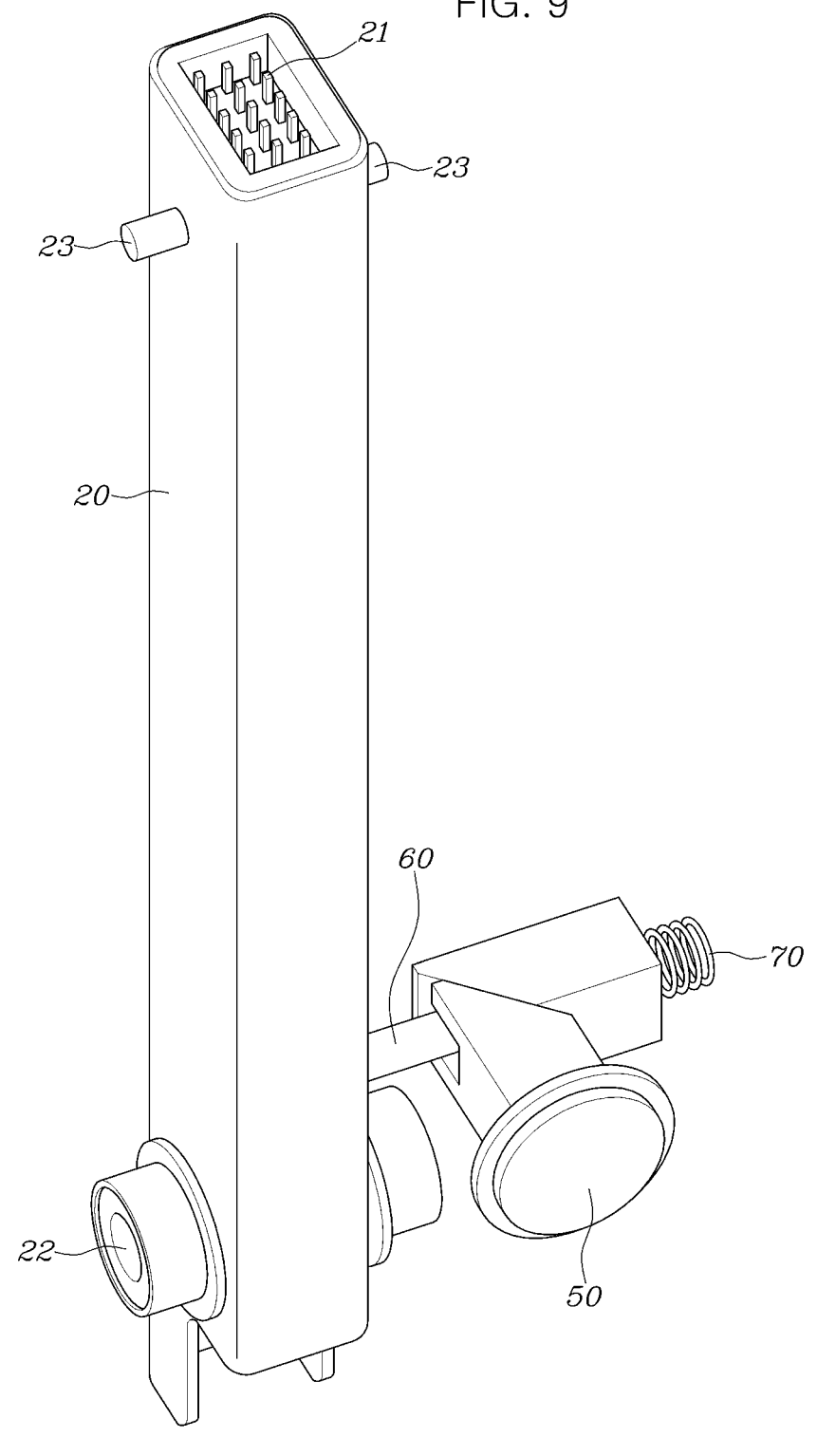
FIG. 9, FIG. 10, FIG. 11, FIG. 12, FIG. 13 and FIG. 14 are drawings illustrating a rod portion according to an exemplary embodiment of the present disclosure.
Figure 10:
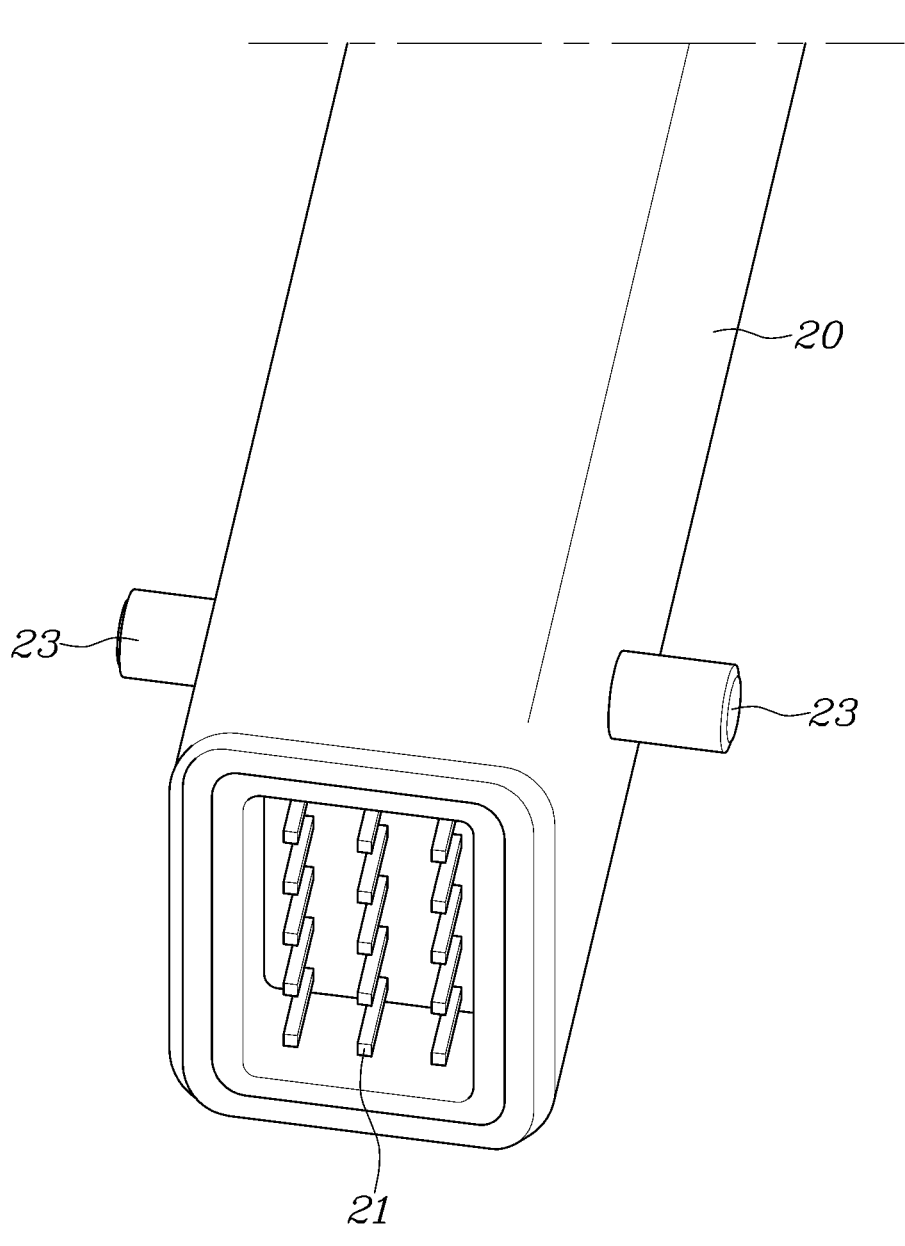
Figure 11:
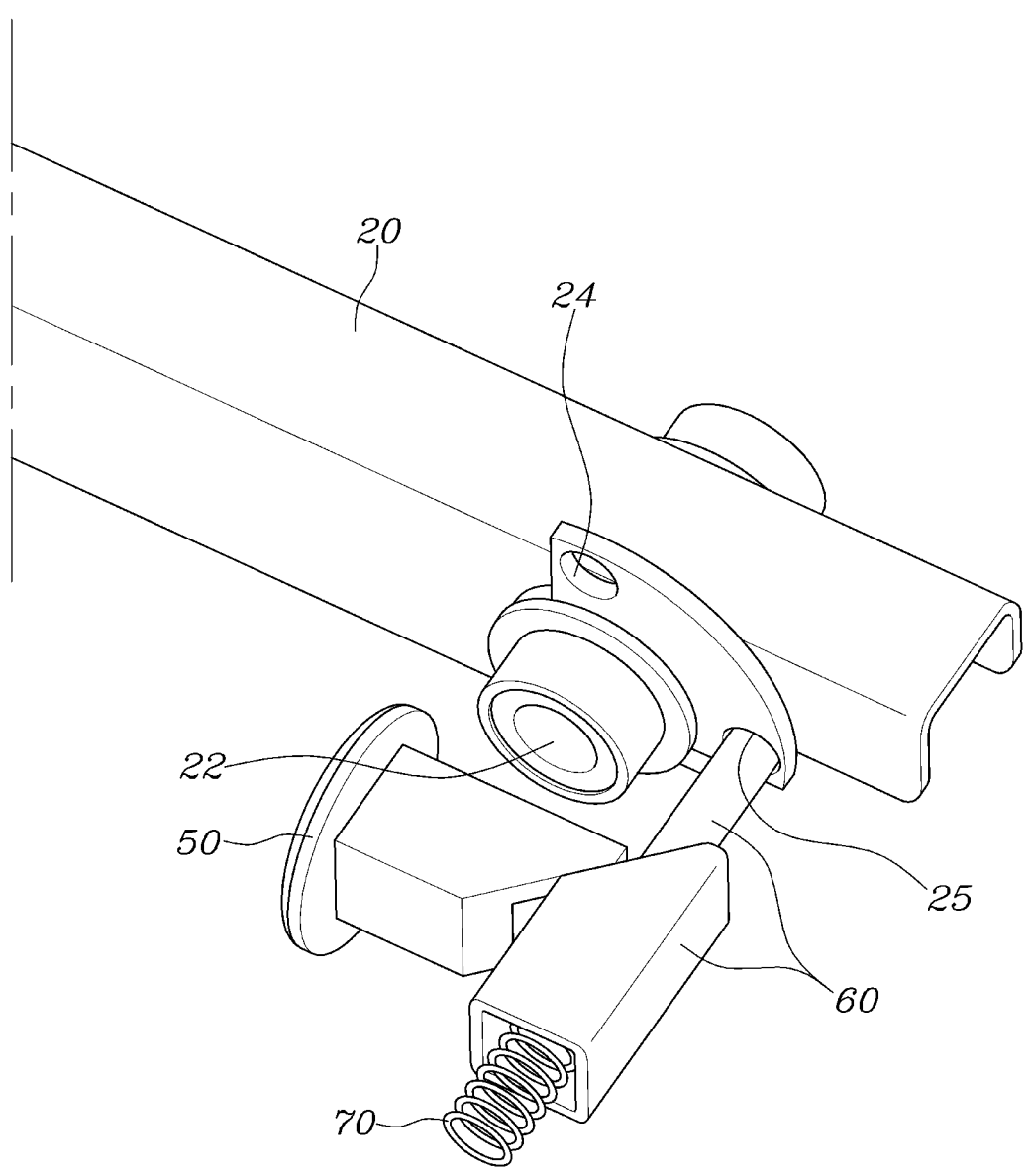

When the user presses the operation button 50 to operate in the state shown in FIG. 3, the fixing pin 60 moves backward to escape from the first hole 24, and the user rotates the rod portion 20 so that it protrudes from the vehicle panel 10 as shown in FIG. 5.

FIG. 5 shows the state in which the rod portion 20 is rotated in the direction R2 in FIG. 12.

In the state where the rod portion 20 protrudes from the vehicle panel 10 as shown in FIG. 5, the fixing pin 60 may be inserted into the second hole 25 to restrict the rotation of the rod portion 20.

According to an exemplary embodiment of the present disclosure, a cover 80 may be provided on the vehicle panel 10 to be movable, and the cover 80 may cover the rod portion 20 inserted into the vehicle panel 10 so as not to be exposed to the outside thereof.

The cover 80 may be provided to slide on the vehicle panel 10 by operation of the user, and the cover 80 may cover the insertion hole 11 formed on the vehicle panel 10, and the rod portion 20 and operation button 50 provided on the vehicle panel 10, so that it looks good in appearance.

Wires 26 connected to the first connector 21 may be aligned inside the rod portion 20 to avoid the mounting pin 23 in the rod portion 20, and the wires 26 is configured to transmit power and signals.

The driving operation device 30 according to an exemplary embodiment of the present disclosure is an integrated operation portion modularized by integrating operation portions for steering, acceleration, braking, and shifting of the vehicle into a single body, and may include a rotation portion 31 that rotates during steering operation, and a fixing portion 32 which is stationary, regardless the rotation of the rotation portion 31, in the center of the rotation portion 31 and includes a locking module 40.

That is, the driving operation device 30 may include a steering operation portion 33, an acceleration operation portion 34, a braking operation portion 35, and a shift operation portion 36. The steering operation portion 33, the acceleration operation portion 34, and the braking operation portion 35 may be provided in the rotation portion 31, and the shift operation portion 36 and a display 37 may be provided in the fixing portion 32, but they are not limited thereto.

The locking module 40 according to an exemplary embodiment of the present disclosure may include: a connector housing 100 coupled to the fixing portion 32 of the driving operation device 30 and including a second connector 110; a rotating locking ring 200 overlapping the connector housing 100 and provided to be rotatable clockwise and counterclockwise about a center line L1; a second spring 300 provided in the connector housing 100, and including one end portion supported by the connector housing 100 and the other end portion thereof provided with an arc guide 310 coupled to the rotating locking ring 200, rotating the rotating locking ring 200, which has been rotated clockwise or counterclockwise, in the opposite direction to return to the original state; a cover plate 400 covering the connector housing 100 and the rotating locking ring 200, and coupled to the fixing portion 32 of the driving operation device 30 so that a portion of the rotating locking ring 200 passes through the same to protrude therefrom; and a rotation lever 500 coupled to the portion of the rotating locking ring 200 passing through the cover plate 400 and protruding therefrom, and configured to rotate, when rotating clockwise or counterclockwise, the rotating locking ring 200 in the same direction.

The connector housing 100 and the cover plate 400 may be fixing components coupled to the fixing portion 32 of the driving operation device 30, and the rotating locking ring 200 and the rotation lever 500 may be rotation components configured for rotating clockwise and counterclockwise.

Two second springs 300 may be disposed at 180 degrees therebetween to face each other in are grooves 120 formed in the connector housing 100. An arc guide 310 may be coupled to one end portion of the second spring 300, and the arc guide 310 may be coupled to the rotating locking ring 200, so that when the rotating locking ring 200 rotates, the arc guide 310 may move along the arc groove 120.

According to an exemplary embodiment of the present disclosure, when the end portion of the rod portion 20 is inserted into the connector housing 100 so that the first connector 21 and the second connector 110 are coupled, the mounting pin 23 may come into contact with the rotating locking ring 200 between the connector housing 100 and a rotating locking ring 200, and the rotating locking ring 200 may restrict movement of the mounting pin 23 in a direction in which the rod portion 20 is separated from the connector housing 100, preventing separation of the rod portion 20.

The locking module 40 according to an exemplary embodiment of the present disclosure may further include an elastic stopper 600 which is fixed to the connector housing 100 and comes into contact with the mounting pin 23 when the rod portion 20 is inserted into the connector housing 100 so that the first connector 21 and the second connector 110 are coupled to each other.

Two elastic stoppers 600 may be disposed at 180 degrees therebetween in the stopper groove 130 formed in the connector housing 100, and the elastic stopper 600 may be made of rubber as an elastic material, but is not limited thereto.

According to an exemplary embodiment of the present disclosure, a second connector 110 may be provided in the center of the connector housing 100, and the arc groove 120 in which the second spring 300 including the arc guide 310 is provided and the stopper groove 130 in which the elastic stopper 600 is provided may be formed on the outside of the second connector 110.

A guide protrusion 210 may be provided on one side of the rotating locking ring 200 to be coupled to the arc guide 310, and a protruding portion 220 may be provided on the other side of the rotating locking ring 200 to pass through the cover plate 400 and be coupled to the rotation lever 500. Furthermore, internal protrusions 230 may be formed on the internal surface of the rotating locking ring 200 to protrude toward the center of the rotating locking ring 200 and face each other.

Two guide protrusions 210, two protruding portions 220, and two internal protrusions 230 may be disposed at 180 degrees, respectively, on the rotating locking ring 200.

The internal protrusion 230 may restrict the movement of the mounting pin 23 when the rod portion 20 is inserted into the connector housing 100 so that the first connector 21 and the second connector 110 are coupled, preventing the rod portion 20 from being separated from the connector housing 100.

When the end portion of the rod portion 20 is inserted into the locking module 40 in the state where the driving operation device 30 and the rod portion 20 are separated, the mounting pin 23 may come into contact with one surface of the internal protrusion 230, which is configured as an inclined surface 231, and the inclined surface 231 may be formed in a point-symmetrical structure with respect to the center of the rotating locking ring 200.

Figure 29:
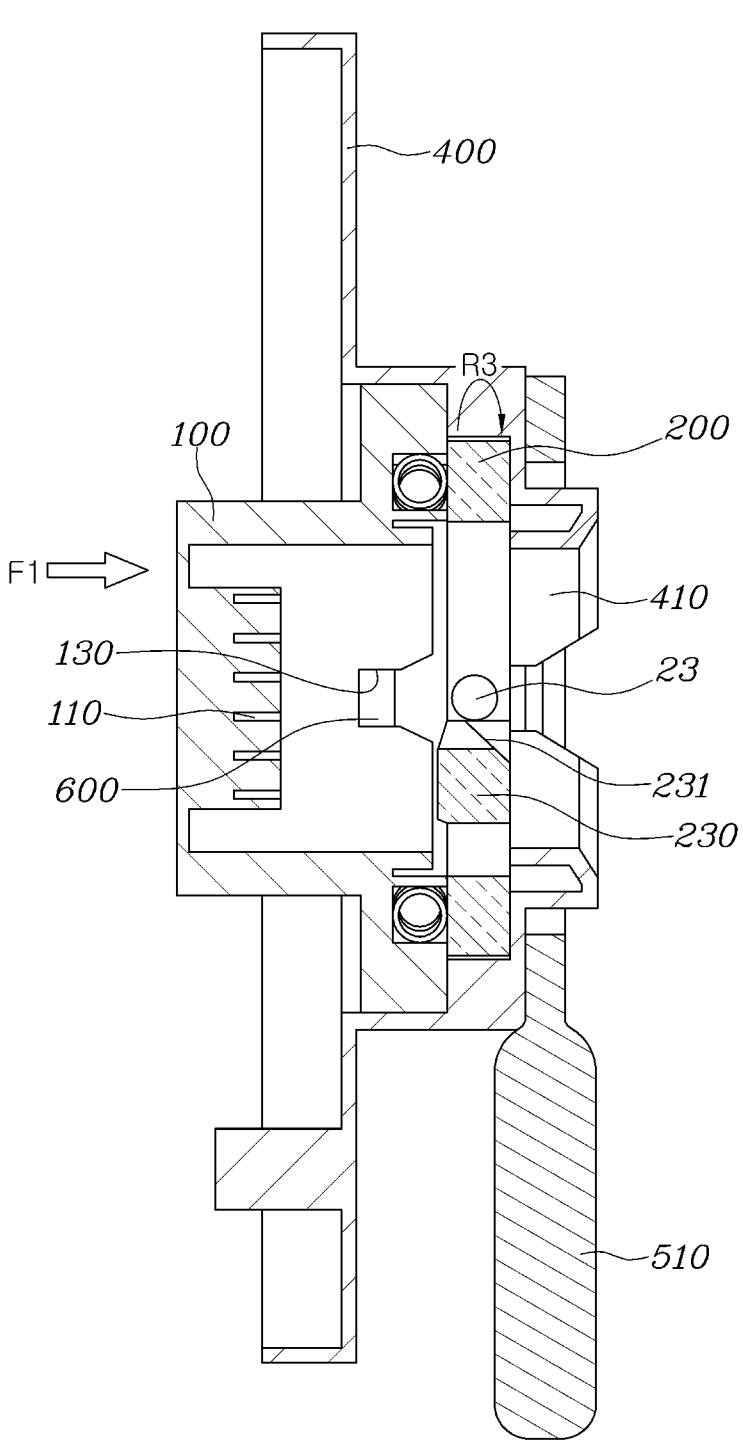
FIG. 29 and FIG. 30 are drawings illustrating a process in which a driving operation device is attached to a rod portion.
Figure 30:
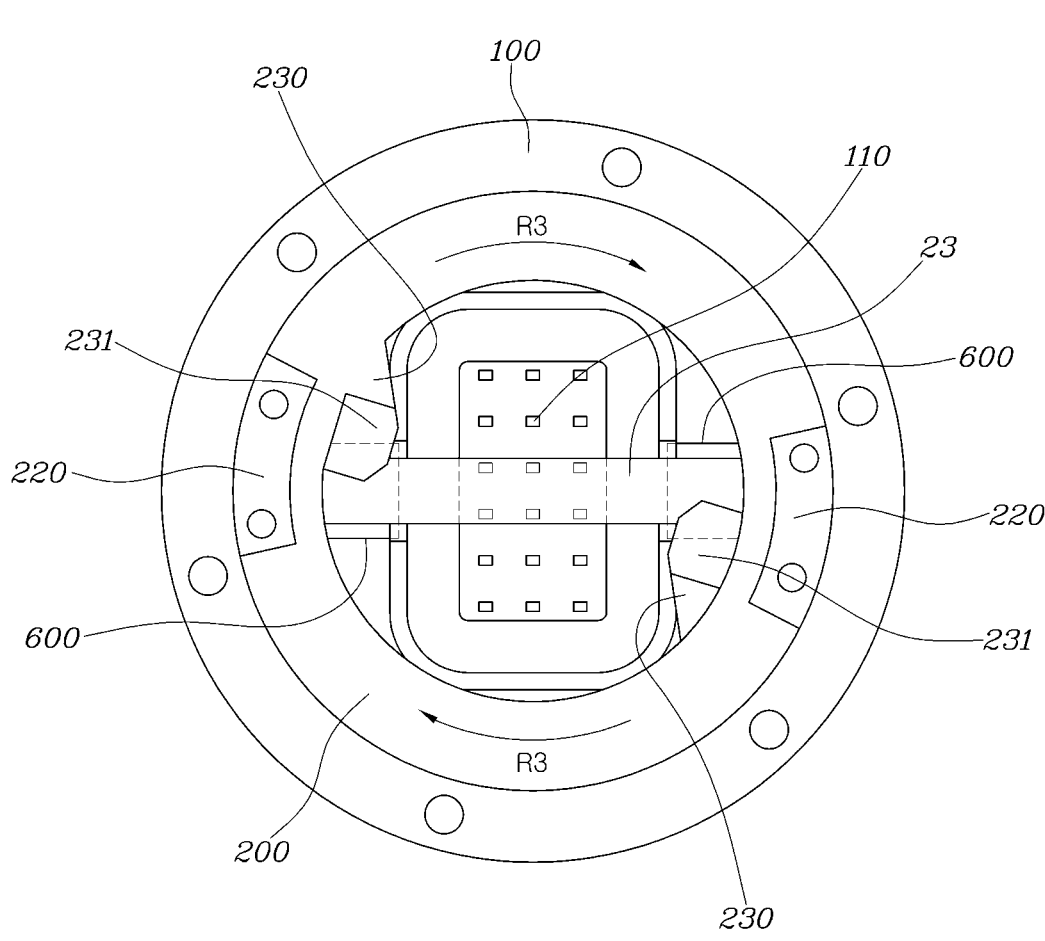

FIG. 5 and FIG. 6, and FIG. 27 and FIG. 28 show the state where the driving operation device 30 and the rod portion 20 are separated, FIG. 29 and FIG. 30 show a process of attaching the driving operation device 30 to the rod portion

20, and FIGS. 7 and 8, and FIG. 31 and FIG. 32 show the state where the driving operation device 30 is attached to the rod portion 20.

Referring to FIG. 29 and FIG. 30, the user may apply a certain force F1 to the driving operation device 30 to attach the driving operation device 30 to the rod portion 20, and at the instant time, the mounting pin 23 of the rod portion 20 may come into contact with the inclined surface 231 of the internal protrusion 230.

If the driving operation device 30 continues to move (to the right in FIG. 30) while the mounting pin 23 is in contact with the inclined surface 231, the rotating locking ring 200 may rotate clockwise as indicated by arrow R3. When the rotating locking ring 200 rotates clockwise, the stopper groove 130 in which the elastic stopper 600 is provided may be opened by the movement of the internal protrusion 230 in the connector housing 100.

Figure 31:
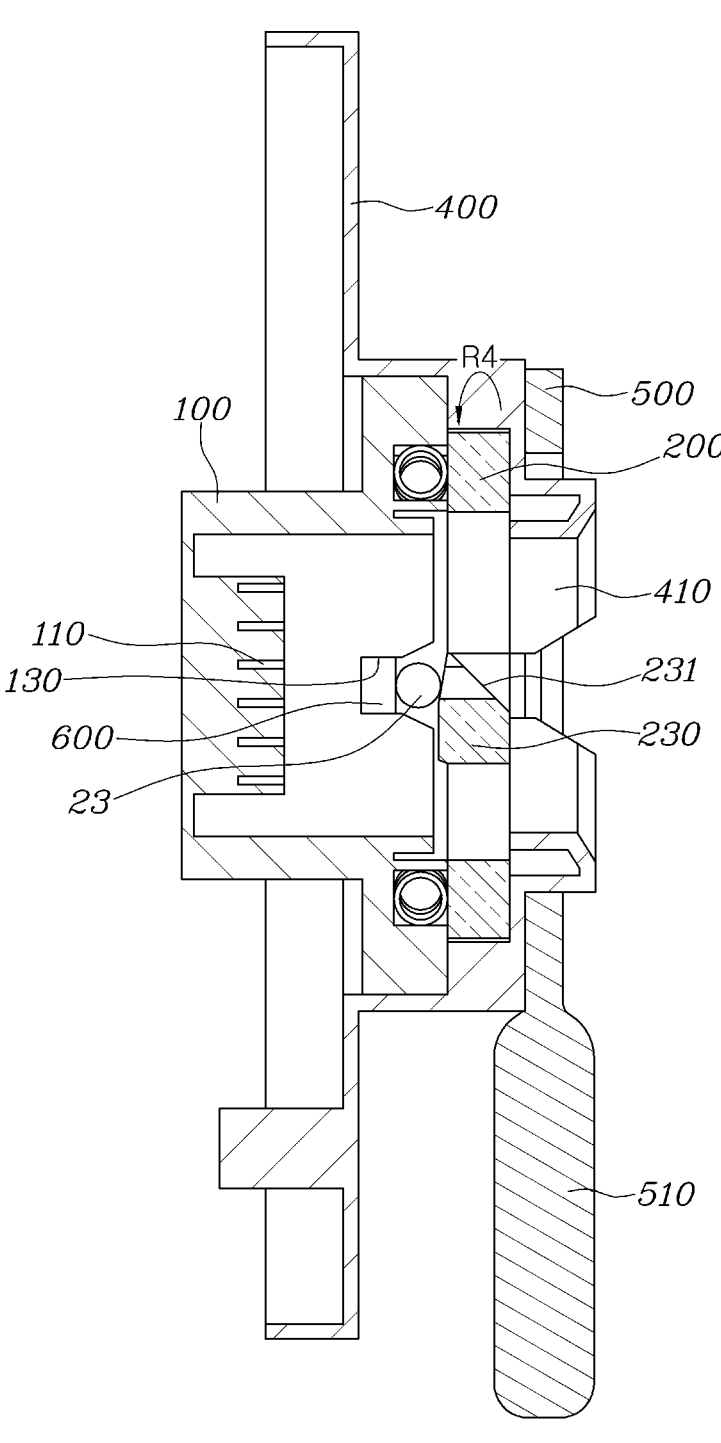
FIG. 31 and FIG. 32 are drawings illustrating the state in which a driving operation device is attached to a rod portion.
Figure 32:
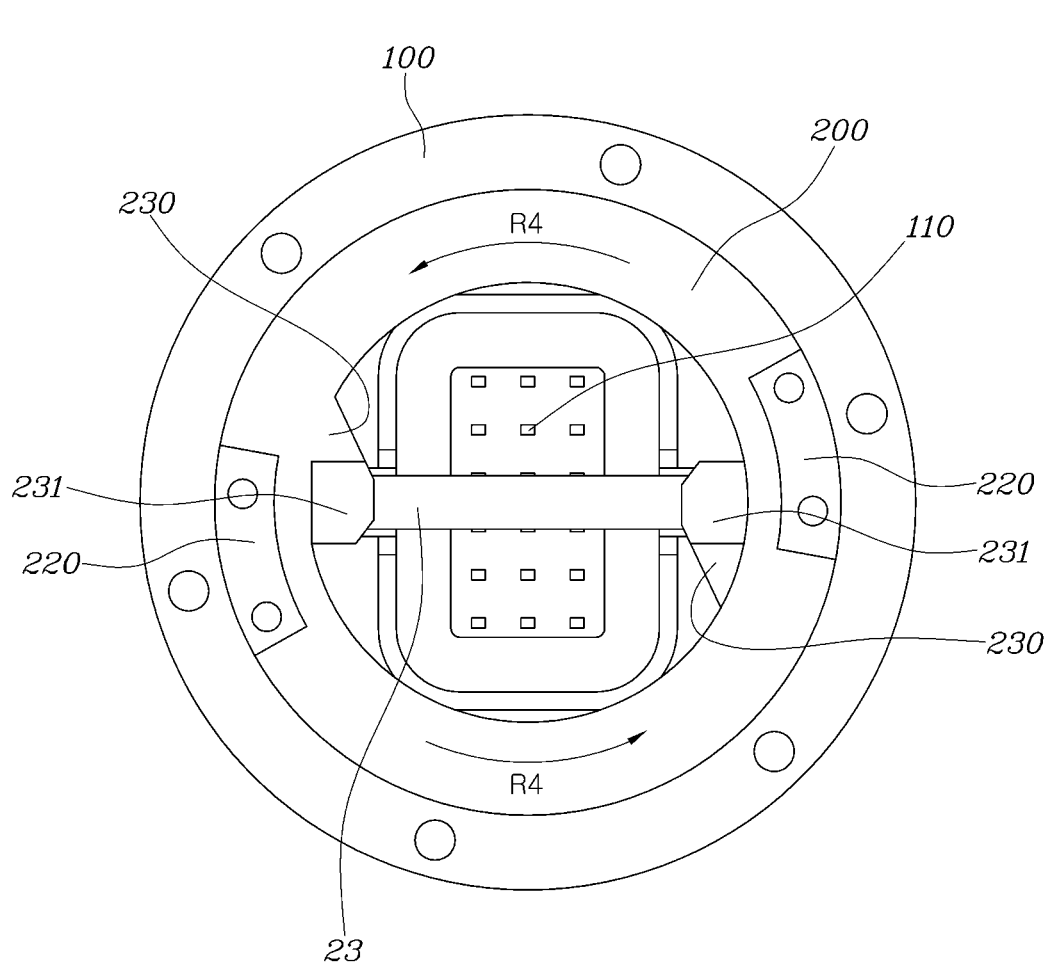

Referring to FIG. 31 and FIG. 32, the mounting pin 23 may be inserted into the open stopper groove 130 to come into contact with the elastic stopper 600, and when the end portion of the rod portion 20 is inserted into the connector housing 100 so that the first connector 21 and the second connector 110 are coupled, the rotating locking ring 200 may be rotated counterclockwise (the direction of arrow R4) by the spring force of the second spring 300 to return to the original state, so that the stopper groove 130 is covered by the internal protrusion 230 and so that the internal protrusion 230 restricts the movement of the mounting pin 23, preventing the rod portion 20 from being separated from the connector housing 100.

After the driving operation device 30 is attached to the rod portion 20, the elastic stopper 600 may expand, and the expansion of the elastic stopper 600 may cause the mounting pin 23 and the internal protrusion 230 of the rotating locking ring 200 to come into contact with each other, preventing a gap.

Figure 22:
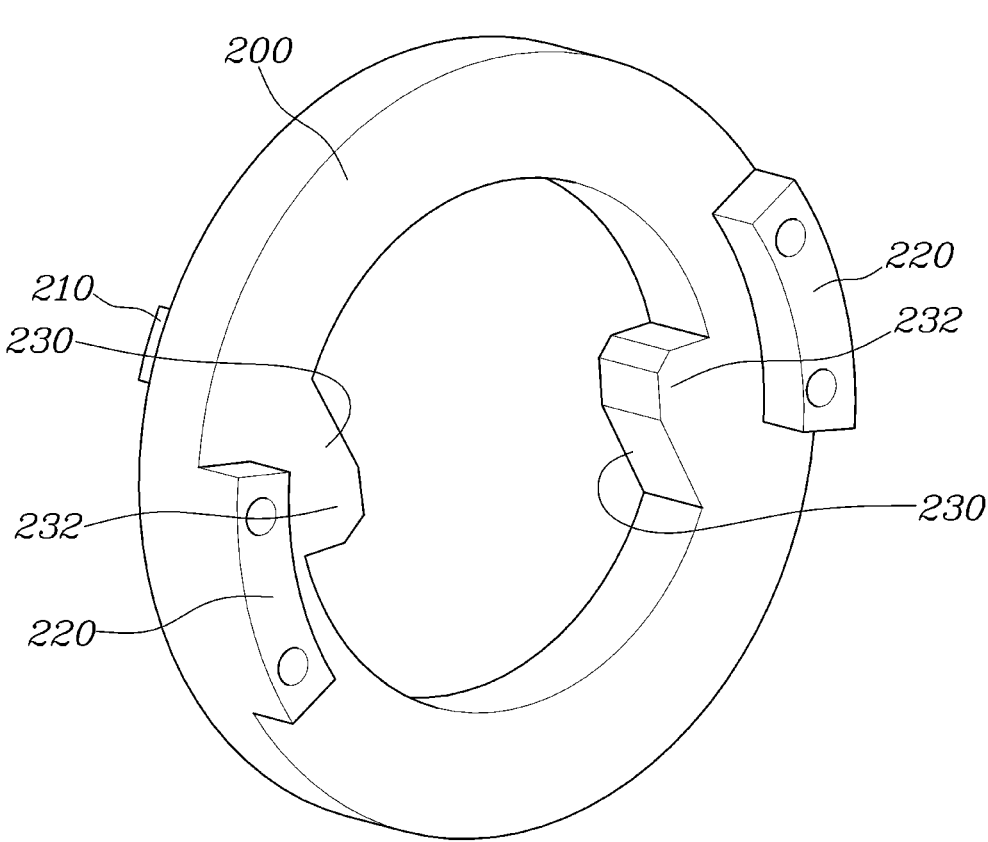
Figure 23:
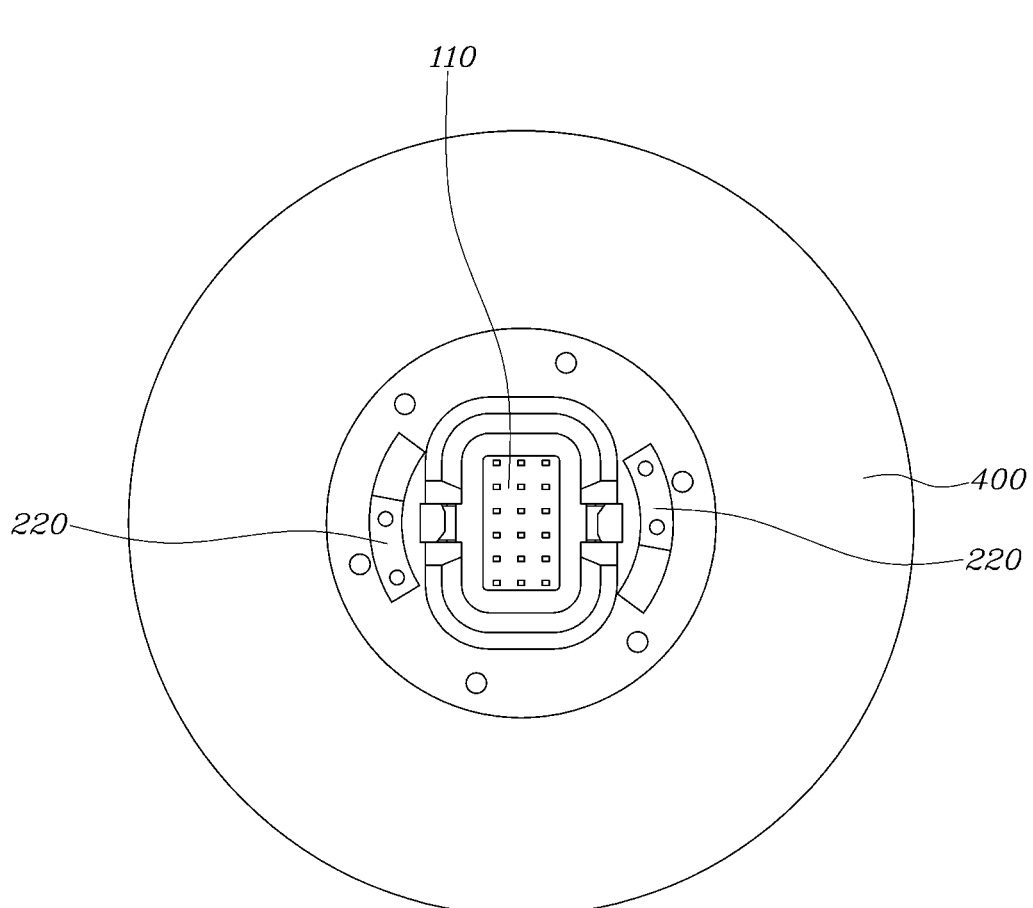

FIG. 22 illustrates another exemplary embodiment of the rotating locking ring 200. The rotating locking ring 200 in FIG. 22 is configured so that one surface of the internal protrusion 230 that comes into contact with the mounting pin 23 is formed as a flat surface 232.

As described above, when the end portion of the rod portion 20 is inserted into the locking module 40 in the state where the driving operation device 30 and the rod portion 20 are separated, the mounting pin 23 may come into contact with one surface of the internal protrusion 230, and the one surface of the internal protrusion 230 that comes into contact with the mounting pin 230 may be formed as a flat surface 232.

When the user holds the handle 510 of the rotation lever 500 and rotates the rotation lever 500 clockwise or counterclockwise while the mounting pin 23 is in contact with the flat surface 232 of the internal protrusion 230, the rotating locking ring 200 may rotate in the same direction as the rotation lever 500, so that the stopper groove 130 in which the elastic stopper 600 is provided in the connector housing 100 may be opened by the rotation of the rotating locking ring 200, and the mounting pin 23 may be inserted into the open stopper groove 130 and may come into contact with the elastic stopper 600.

That is, if one surface of the internal protrusion 230 that comes into contact with the mounting pin 23, when attaching the driving operation device 30 to the rod portion 20, is configured as the inclined surface 231, the stopper groove 130 is opened by the rotating locking ring 200 rotating by itself due to the pressurization of the mounting pin 23, whereas if one surface of the internal protrusion 230 is configured as the flat surface 232, the stopper groove 130 is opened by the rotation of the rotating locking ring 200 when the user rotates the rotation lever 500.

FIG. 33 shows the state where the driving operation device 30 is detached from the rod portion 20 while the driving operation device 30 is attached to the rod portion 20.

When the user presses the driving operation device 30 toward the vehicle panel 10 (see F2 in FIG. 33) in the state in which the driving operation device 30 is attached to the rod portion 20 by coupling of the rod portion 20 and the locking module 40, the mounting pin 23 may press the elastic stopper 600 to be compressed, so that a predetermined gap G1 corresponding to the compression of the elastic stopper 600 may be generated between the mounting pin 23 and the internal protrusion 230 of the rotating locking ring 200.

With the gap G1 generated above, if the user holds the handle 510 of the rotation lever 500 and rotates the rotation lever 500 clockwise or counterclockwise, the rotating locking ring 200 may rotate in the same direction as the rotation lever 500, so that the stopper groove 130 in which the elastic stopper 600 is provided may be opened by the rotation of the rotating locking ring 200. Accordingly, if the user pulls the driving operation device 30 in the state where the stopper groove 130 is open, the rod portion 20 and the locking module 40 may be separated, so that the driving operation device 30 is able to be detached from the rod portion 20.

If the user rotates the rotation lever 500 clockwise or counterclockwise without the gap G1 generated above, friction may occur between the mounting pin 23 and the rotating locking ring 200, which may hinder smooth rotation of the rotating locking ring 200. To prevent this, it is preferable to rotate the rotation lever 500 after generating a predetermined gap G1 between the mounting pin 23 and the internal protrusion 230 of the rotating locking ring 200.

Figure 24:
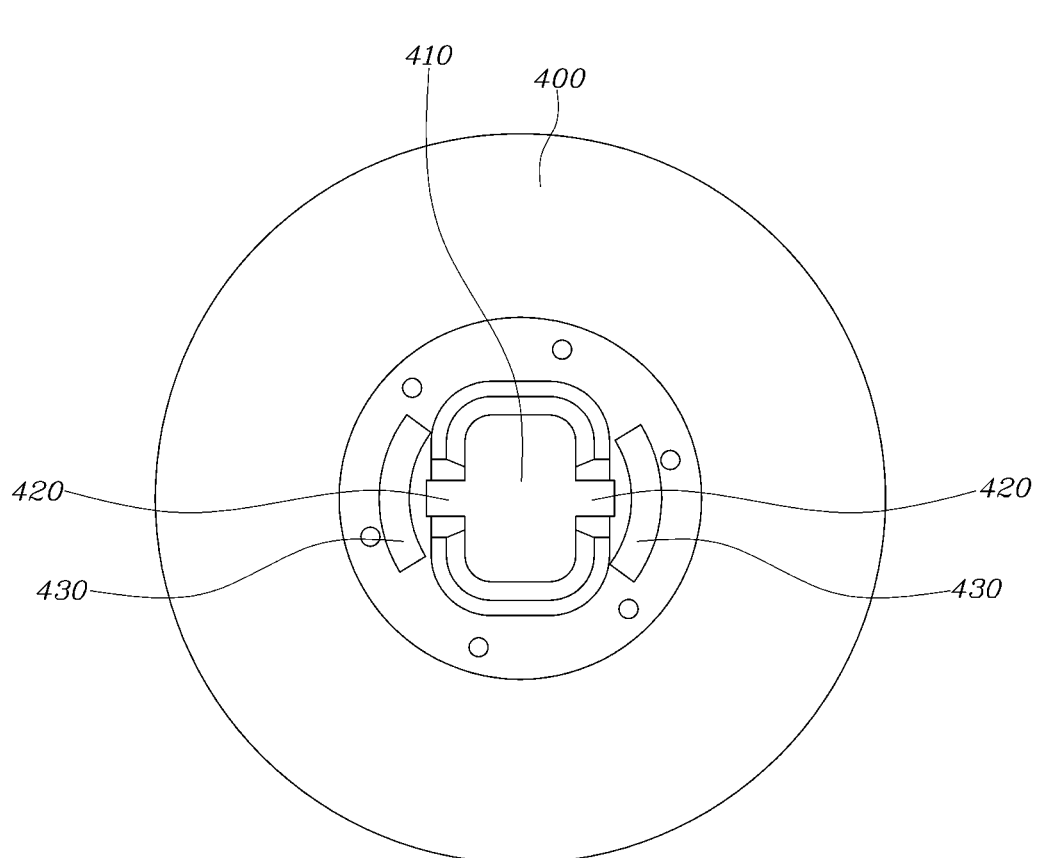
Figure 25:
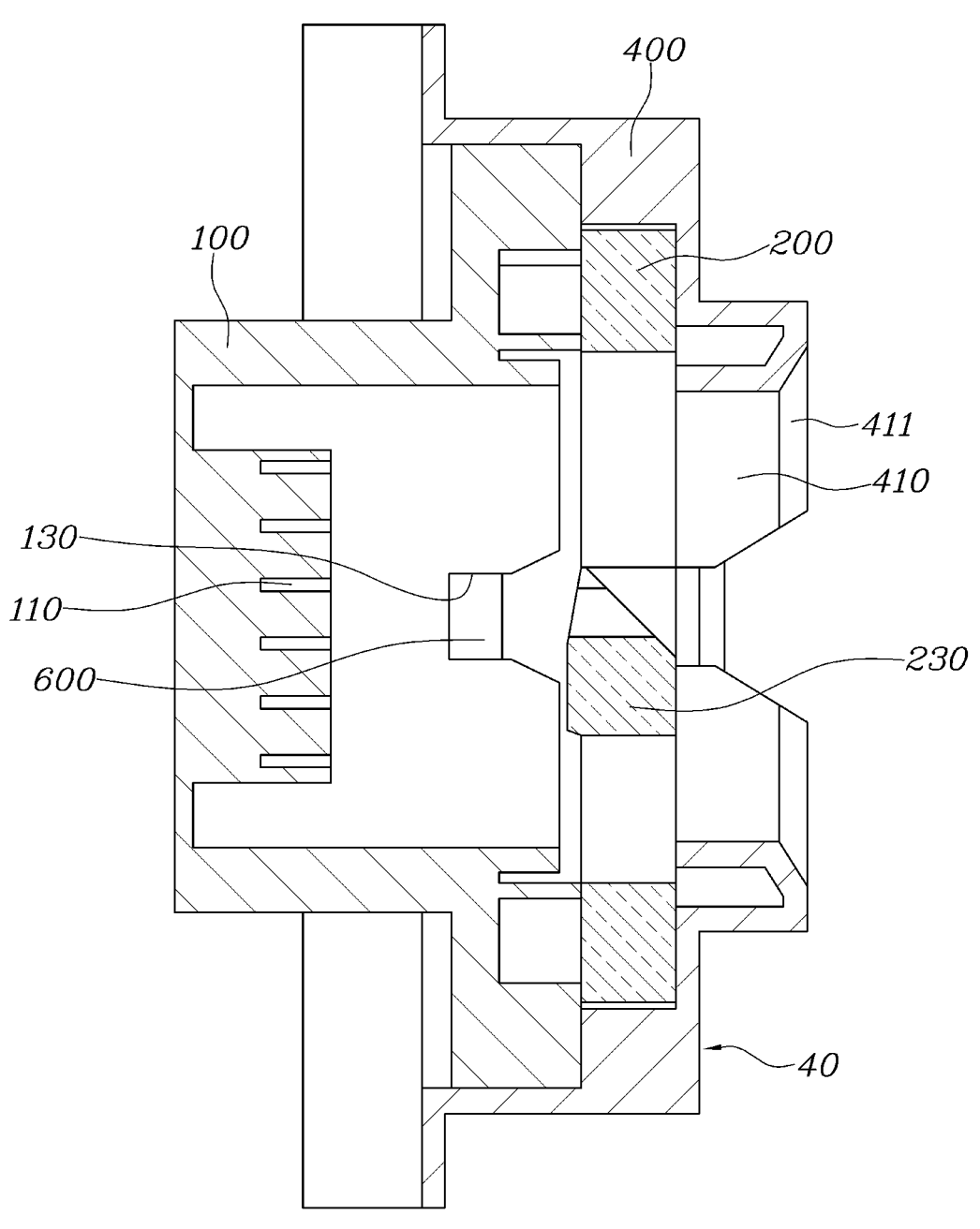
Figure 26:
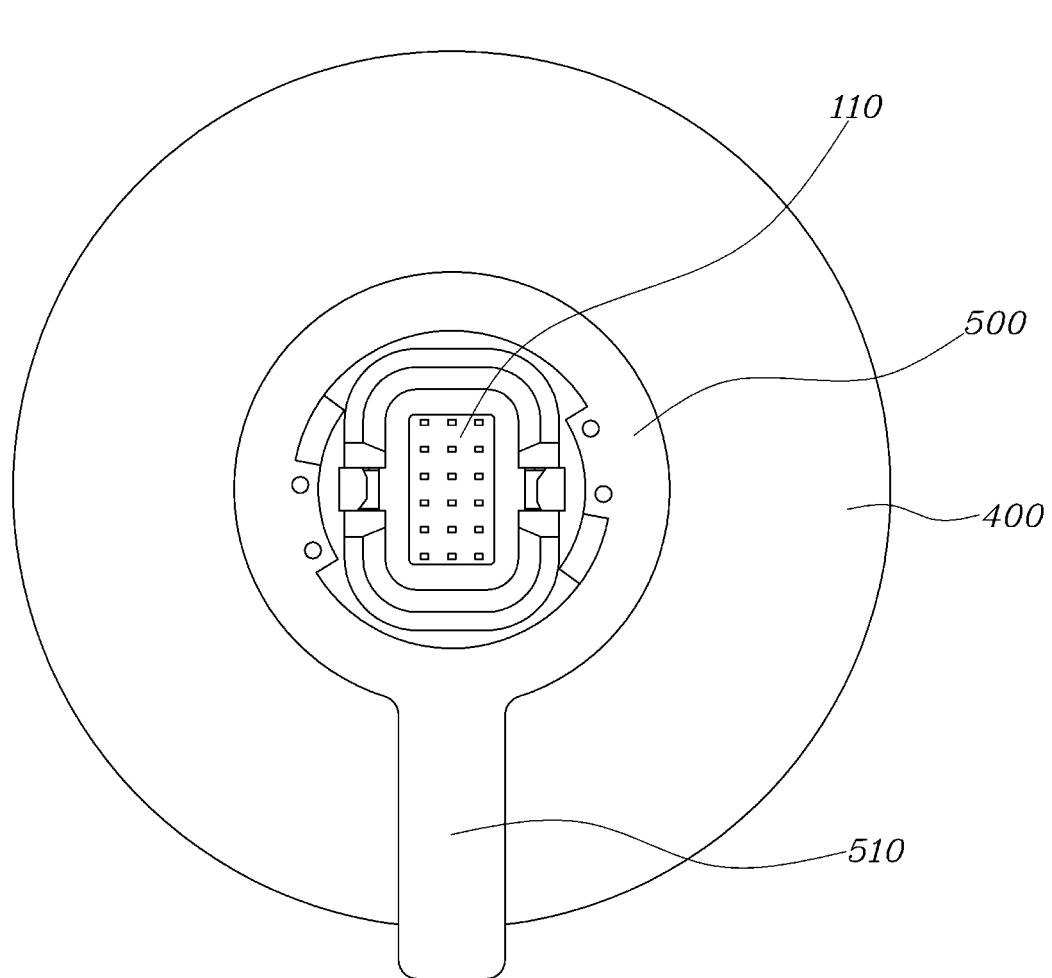
Figure 27:
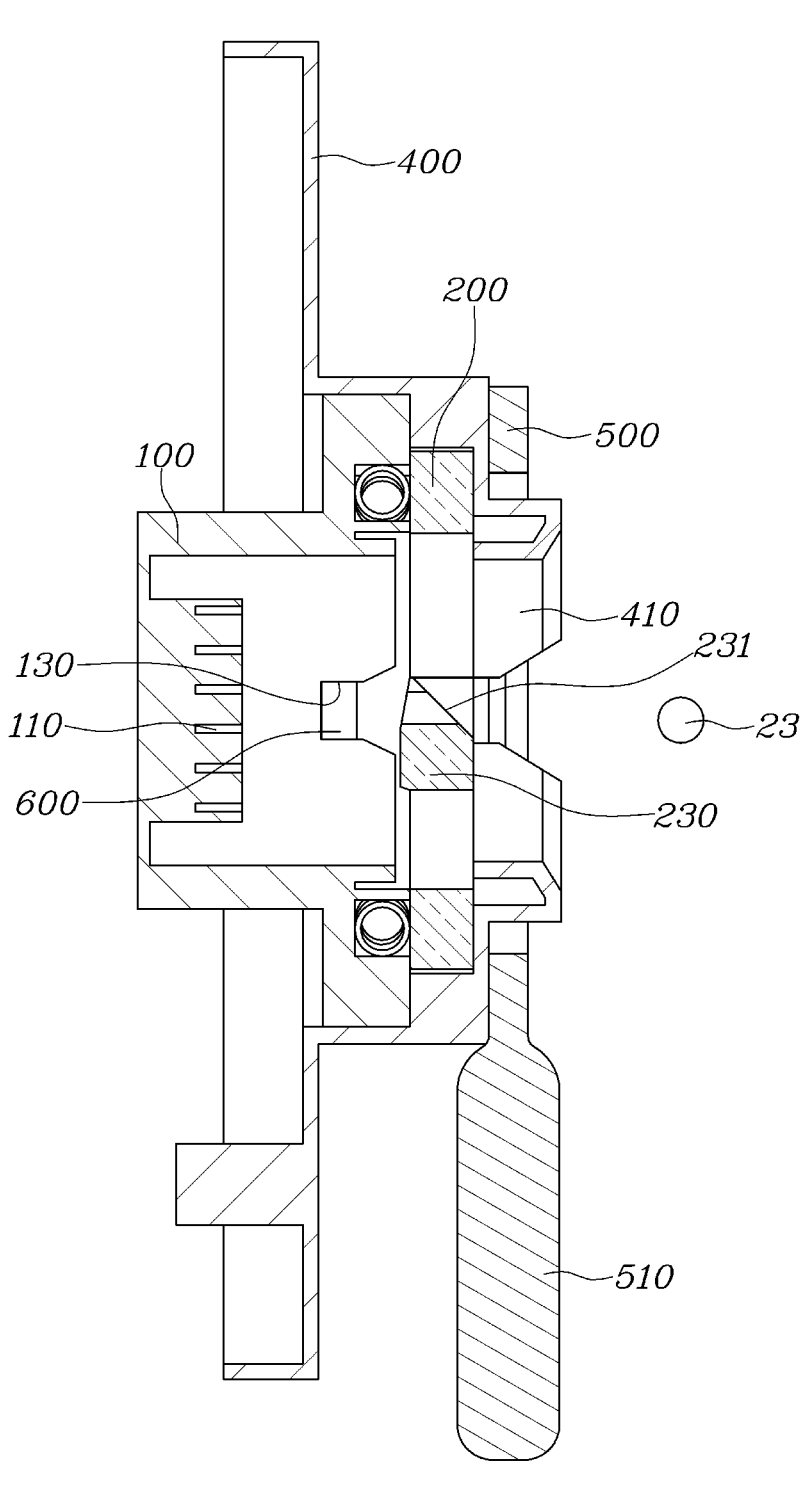
FIG. 27 and FIG. 28 are drawings illustrating the state in which a driving operation device and a rod portion are separated.
Figure 28:
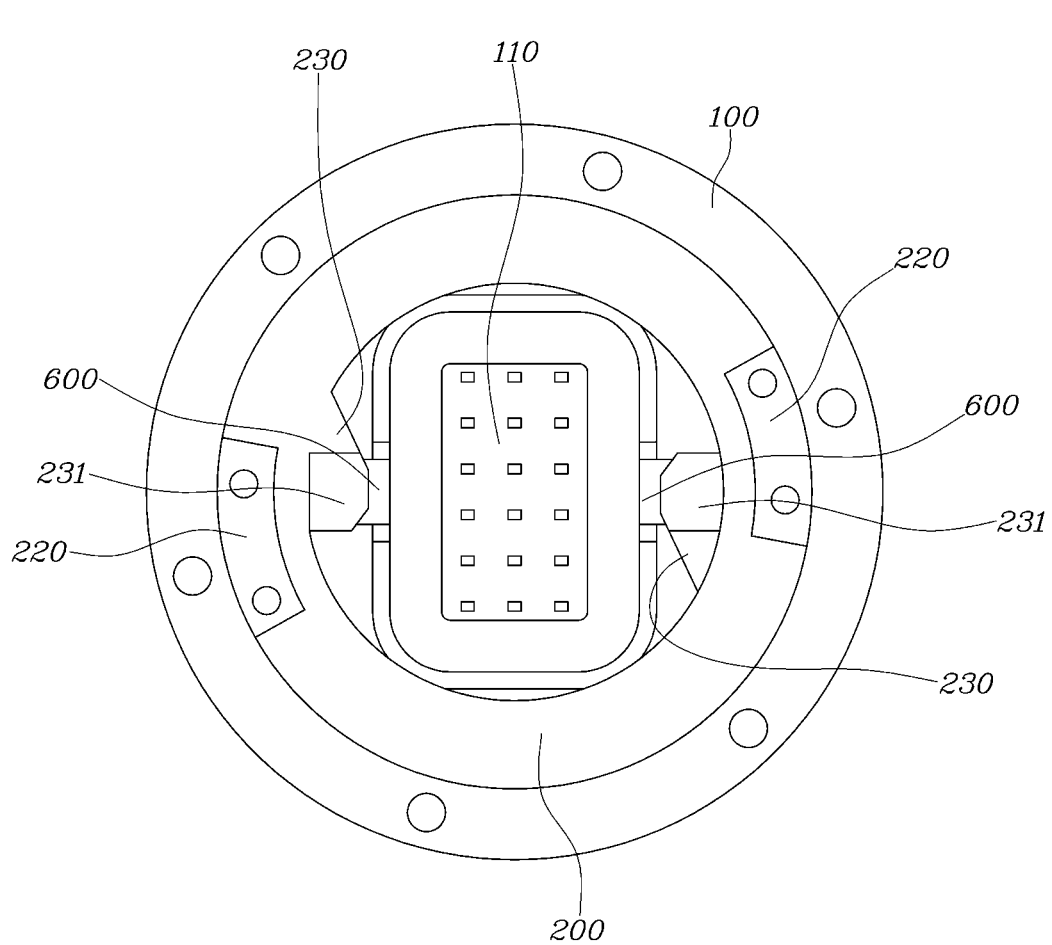

Referring to FIGS. 24 and 25, the cover plate 400 according to an exemplary embodiment of the present disclosure may include a central hole 410 in the center through which the end portion of the rod portion 20 passes, and a mounting pin hole 420 through which the mounting pin 23 passes may be formed on both sides of the central hole 410 to connect with the mounting pin 23, and a protruding portion hole 430 through which the protruding portion 220 of the rotating locking ring 200 passes may be formed in an arc shape on the external side of the mounting pin hole 420.

The entrance 411 of the central hole 410 may be formed to include a trapezoidal cross-section that spreads outward to facilitate insertion of the end portion of the rod portion 20, and the length of the protruding portion hole 430 be configured greater than the length of the protruding portion 220 so that the rotating locking ring 200 is able to rotate clockwise or counterclockwise in the state where the protruding portion 220 is inserted into the protruding portion hole 430.

As described above, the attachment and detachment apparatus for a driving operation device of a vehicle according to an exemplary embodiment of the present disclosure is configured to attach or detach the driving operation device 30, which is modularized by integrating the operation portions for steering, acceleration, braking, and shifting of the vehicle into a single body, to or from the vehicle panel 10 so that the driving operation device 30 is mounted to the vehicle panel 10 and used in a manual driving mode and is removed from the vehicle panel 10 in an autonomous driving mode, increasing the usability of internal space.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "or" used in an exemplary embodiment of the present disclosure should be interpreted as indicating "additionally or alternatively."

The term "and/or" may include a combination of a plurality of related listed items or any of a plurality of related listed items. For example, "A and/or B" includes all three cases such as "A", "B", and "A and B".

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the present specification, unless stated otherwise, a singular expression includes a plural expression unless the context clearly indicates otherwise.

The terms used to describe the exemplary embodiments are used for describing predetermined embodiments, and are not intended to limit the embodiments. As used in the description of the exemplary embodiments and in the claims, the singular forms "a", "an", and "the" include plural referents unless the context clearly dictates otherwise. The expression "and/or" is used to include all possible combinations of terms.

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

As used herein, conditional expressions such as "if" and "when" are not limited to an optional case and are intended to be interpreted, when a predetermined condition is satisfied, to perform the related operation or interpret the related definition according to the predetermined condition.

Terms such as first and second may be used to describe various elements of the embodiments. However, various components according to the exemplary embodiments should not be limited by the above terms. These terms are only used to distinguish one element from another.

According to an exemplary embodiment of the present disclosure, components may be combined with each other to be implemented as one, or some components may be omitted.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An attachment and detachment apparatus for a driving operation device of a vehicle, the apparatus comprising:
   a rod portion which is rotatably coupled to a vehicle panel, protrudes from the vehicle panel and is inserted into the vehicle panel when rotated, and includes a first connector provided at a first end portion of the rod portion; and
   a locking module which is provided in the driving operation device of the vehicle, is configured for being coupled to and separated from the rod portion, and includes a second connector connected to the first connector when coupled to the rod portion.

2. The attachment and detachment apparatus of claim 1, further including:
   a mounting pin mounted at the first end portion of the rod portion and including first and second end portions protruding laterally from the rod portion,
   wherein, based on that the first end portion of the rod portion is inserted into the locking module, the mounting pin is secured by the locking module, preventing separation of the rod portion and the locking module.

3. The attachment and detachment apparatus of claim 2, wherein wires are mounted inside the rod portion to avoid the mounting pin and connected to the first connector.

4. The attachment and detachment apparatus of claim 2, wherein the driving operation device includes:
   a rotation portion that rotates during steering operation; and
   a fixing portion which is stationary, regardless of rotation of the rotation portion, in the center of the rotation portion and includes a locking module.

5. The attachment and detachment apparatus of claim 4, wherein the driving operation device further includes a steering operation portion, an acceleration operation portion, a braking operation portion, and a shift operation portion,
   wherein the steering operation portion, the acceleration operation portion, and the braking operation portion are provided in the rotation portion, and
   wherein the shift operation portion and a display are provided in the fixing portion.

6. The attachment and detachment apparatus of claim 4, wherein the locking module includes:
   a connector housing coupled to the fixing portion of the driving operation device and including the second connector;
   a rotating locking ring overlapping the connector housing and provided to be rotatable clockwise and counterclockwise about a center line;
   a second spring provided in the connector housing, and including a first end portion supported by the connector housing and a second end portion provided with an arc guide coupled to the rotating locking ring, rotating the rotating locking ring, which has been rotated clockwise or counterclockwise, in rotation opposite direction to return to an original state;
   a cover plate configured to cover the connector housing and the rotating locking ring, and coupled to the fixing portion of the driving operation device so that a portion of the rotating locking ring passes through the cover plate to protrude from the cover plate; and
   a rotation lever coupled to the portion of the rotating locking ring passing through the cover plate and protruding from the cover plate, and configured to rotate, when rotating clockwise or counterclockwise, the rotating locking ring in the same direction.

7. The attachment and detachment apparatus of claim 6, wherein, based on that the first end portion of the rod portion is inserted into the connector housing so that the first connector and the second connector are coupled, the mounting pin comes into contact with the rotating locking ring between the connector housing and the rotating locking ring, and the rotating locking ring restricts movement of the mounting pin in a direction in which the rod portion is separated from the connector housing, preventing separation of the rod portion.

8. The attachment and detachment apparatus of claim 6, further including:
   an elastic stopper which is fixed to the connector housing and comes into contact with the mounting pin based on that the rod portion is inserted into the connector housing so that the first connector and the second connector are coupled.

9. The attachment and detachment apparatus of claim 8, wherein the second connector is provided in the center of the connector housing, and
   wherein an arc groove in which a second spring including the arc guide is provided and a stopper groove in which the elastic stopper is provided are formed on an outside of the second connector.

10. The attachment and detachment apparatus of claim 8, wherein a guide protrusion is formed on one side of the rotating locking ring to be coupled to the arc guide,
    wherein a protruding portion is formed on another side of the rotating locking ring to pass through the cover plate and coupled to the rotation lever,
    wherein internal protrusions are formed on an internal surface of the rotating locking ring to protrude toward the center of the rotating locking ring and face each other, and
    wherein the internal protrusions restrict movement of the mounting pin based on that the rod portion is inserted into the connector housing so that the first connector and the second connector are coupled, preventing the rod portion from being separated from the connector housing.

11. The attachment and detachment apparatus of claim 10, wherein, based on that the first end portion of the rod portion is inserted into the locking module in a state where the driving operation device and the rod portion are separated, the mounting pin comes into contact with one surface of the internal protrusion, and
    wherein the one surface of the internal protrusion that comes into contact with the mounting pin is configured as an inclined surface.

12. The attachment and detachment apparatus of claim 11, wherein a pair of internal protrusions is formed on the internal surface of the rotating locking ring to face each other, and
    wherein the inclined surface is formed in a point-symmetrical structure with respect to the center of the rotating locking ring.

13. The attachment and detachment apparatus of claim 11, wherein, based on that the mounting pin moves toward the connector housing while being in contact with the inclined surface, the rotating locking ring rotates clockwise or counterclockwise, wherein, based on that the rotating locking ring rotates clockwise or counterclockwise, a stopper groove in which the elastic stopper is provided is opened in the connector housing, and wherein the mounting pin is inserted into the open stopper groove and comes into contact with the elastic stopper.

14. The attachment and detachment apparatus of claim 13, wherein, based on that the mounting pin comes into contact with the elastic stopper and based on that the first connector and the second connector are coupled, the rotating locking ring rotates in the opposite direction by spring force of a second spring and returns to the original state, so that the stopper groove is covered by the internal protrusions, and wherein the internal protrusions restrict movement of the mounting pin and prevent the rod portion from being separated from the connector housing.

15. The attachment and detachment apparatus of claim 14, wherein, based on that a user presses the driving operation device toward the vehicle panel in a state where driving operation device is attached to the rod portion due to coupling of the rod portion and the locking module, the mounting pin presses the elastic stopper to be compressed, wherein a predetermined gap is generated between the mounting pin and the internal protrusions of the rotating locking ring, wherein with the gap generated above, based on that the user holds a handle of the rotation lever and rotates the rotation lever clockwise or counterclockwise, the rotating locking ring rotates together with the rotation lever, wherein the stopper groove in which the elastic stopper is provided is opened by the rotation of the rotating locking ring, and wherein, based on that the user pulls the driving operation device in the state where the stopper groove is opened, the rod portion and the locking module are separated, so that the driving operation device is detached from the rod portion.

16. The attachment and detachment apparatus of claim 10, wherein, based on that the first end portion of the rod portion is inserted into the locking module in a state where the driving operation device and the rod portion are separated, the mounting pin comes into contact with one surface of the internal protrusions, wherein the one surface of the internal protrusions that comes into contact with the mounting pin is formed as a flat surface, wherein, based on that a user holds a handle of the rotation lever and rotates the rotation lever clockwise or counterclockwise while the mounting pin is in contact with the flat surface of the internal protrusions, the rotating locking ring rotates together with the rotation lever, wherein the rotation of the rotating locking ring opens the stopper groove in which the elastic stopper is provided in the connector housing, and wherein the mounting pin is inserted into the opened stopper groove and comes into contact with the elastic stopper.

17. The attachment and detachment apparatus of claim 8, wherein a central hole is formed in the center of the cover plate so that the first end portion of the rod portion passes therethrough, wherein a mounting pin hole through which the mounting pin passes is formed on first and second sides of the central hole to connect with the mounting pin, wherein a protruding portion hole through which the protruding portion of the rotating locking ring passes is formed in an arc shape on an external side of the mounting pin hole, and wherein an entrance of the central hole is formed to include a trapezoidal cross-section that spreads outward.

18. The attachment and detachment apparatus of claim 1, wherein a first hole and a second hole are formed at a second end portion of the rod portion to be spaced apart from each other along a rotation direction about a hinge rotatably coupling the rod portion and the vehicle panel, wherein the vehicle panel includes an operation button, wherein a fixing pin is provided on the vehicle panel with a first spring and engaged with the operation button, and wherein, based on that the operation button is operated, the fixing pin moves in a straight line to be inserted into the first hole or the second hole for restricting the rotation of the rod portion, or to escape from the first hole or the second hole for releasing the rotation restriction of the rod portion.

19. The attachment and detachment apparatus of claim 18, wherein based on that the fixing pin is inserted into one of the first hole and the second hole, the rod portion is restricted from rotating while protruding from the vehicle panel, and based on that the fixing pin is inserted into another of the first hole and the second hole, the rod portion is restricted from rotating while inserted into the vehicle panel.

20. The attachment and detachment apparatus of claim 1, wherein a cover is provided in the vehicle panel to be movable, and wherein the cover is configured to cover the rod portion inserted into the vehicle panel so as not to be exposed from the vehicle panel.

\* \* \* \* \*